United States Patent
Balkir et al.

(10) Patent No.: US 6,981,010 B1
(45) Date of Patent: Dec. 27, 2005

(54) SYSTEM AND METHOD FOR GENERATING PSUEDO-NOISE SEQUENCES

(75) Inventors: Sina Balkir, Lincoln, NE (US); Walter D. Leon Salas, Lincoln, NE (US); Michael W. Hoffman, Lincoln, NE (US); Lance C. Perez, Lincoln, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 766 days.

(21) Appl. No.: 09/906,213

(22) Filed: Jul. 17, 2001

Related U.S. Application Data

(60) Provisional application No. 60/222,521, filed on Aug. 2, 2000.

(51) Int. Cl.⁷ .................................. G06F 1/02
(52) U.S. Cl. ..................................... 708/250
(58) Field of Search ................... 708/250–256

(56) References Cited

U.S. PATENT DOCUMENTS

| | | | | |
|---|---|---|---|---|
| 4,852,023 A | | 7/1989 | Lee et al. ................... 364/717 |
| 4,959,832 A | * | 9/1990 | Bardell, Jr. ................. 714/739 |
| 5,068,872 A | | 11/1991 | Schroter ......................... 375/1 |
| 5,291,555 A | | 3/1994 | Cuomo et al. ................. 380/6 |
| 5,519,736 A | | 5/1996 | Ishida ........................ 375/367 |
| 5,566,099 A | | 10/1996 | Shimada ..................... 364/717 |
| 5,602,845 A | * | 2/1997 | Wahl ....................... 370/395.7 |
| 5,796,776 A | | 8/1998 | Lomp et al. ................ 375/222 |
| 5,910,907 A | | 6/1999 | Chen et al. .............. 364/724.1 |
| 5,943,361 A | | 8/1999 | Gilhousen et al. .......... 375/200 |
| 6,031,865 A | | 2/2000 | Kelton et al. ............... 375/206 |
| 6,128,332 A | | 10/2000 | Fukawa et al. ............. 375/146 |
| 6,148,053 A | | 11/2000 | Ozluturk ..................... 375/377 |
| 6,215,778 B1 | | 4/2001 | Lomp et al. ................ 370/335 |
| 6,629,116 B1 | * | 9/2003 | Rabeler ..................... 708/250 |
| 6,724,805 B1 | * | 4/2004 | Vigoda ....................... 375/130 |

* cited by examiner

Primary Examiner—D. H. Malzahn
(74) Attorney, Agent, or Firm—James D. Welch

(57) ABSTRACT

Disclosed is a method for generating psuedo-noise (PN) sequences utilizing a system comprised of a quantizer, and N directly quantized output/input map containing chaotic map cells, each in functional combination with combiner means and an m-bit shift register.

31 Claims, 21 Drawing Sheets

SYSTEM AND METHOD FOR GENERATING PSUEDO-NOISE SEQUENCES

This Application is a CIP of Provisional Application Ser. No. 60/222,521 filed Aug. 2, 2000.

TECHNICAL FIELD

The present invention relates to generation of psuedo-noise (PN) sequences, and more particularly is a method for generating psuedo-noise sequences utilizing a system which is comprised of N directly quantized output/input map containing chaotic map cells, each thereof being in functional combination with a combiner means and a shift register, which system further comprises a quantizer positioned to receive input from the first chaotic map cell, and in response outputting a (PN) sequence.

BACKGROUND

Systems which utilize spread spectrum communication techniques, such as Direct-Sequence-Code-Division-Multiple-Access (DS-CDMA), have received increased attention over the last decade as a result of the advantages they provide in enhancing multiple access capacity in mobile communication systems. In that light, it is noted that an essential component in spread spectrum communications systems is a Psuedo-Random or Psuedo-Noise (PN) Sequence Generator System. Psuedo-Noise (PN) sequences generated thereby are used at Transmitters to generate wideband signals, and at Receivers to recover narrowband messages. The performance of (DS-CDMA) systems relies on the quality of the signal isolation between the many message signals which share the same frequency band. In that light it is noted that the presence of many interfering users, good isolation can be established by assigning different users different (PN) sequences, which (PN) sequences have nearly orthogonal properties with respect to one another. This, of course, requires the availability of a large space of (PN) sequences with low cross-correlation properties. Conventional (PN) sequences are typified by the class of maximal length (m-) sequences generated by Linear Feedback Shift Registers (LFSR's). However, the number of such sequences generated by LFSR's may be insufficient for wideband (DS-CDMA) systems with a very large number of users. In addition, (LSFR) techniques provide limited flexibility in incorporating security into multiple user systems.

The use of chaotic sequences as spreading waveforms in DS-CDMA communication systems has been recently proposed in articles such as:

"A Chaotic Direct-Sequence Spread Spectrum Communications System", Heidari-Betani et al., IEEE Trans. on Commun, Vol. 42, pp. 1524, (1994);

"Chaotic Complex Spreading Sequences For Asynchronous DS-CDMA, Part II: Some Theoretical Performance Bounds", Rovatti et al., IEEE Trans. Circ. Sys., Part I, Vol. 45, No. 4, pp. 496, (1998);

"Non-Average Performance Of Chaos-Based DS-CDMA: Driving Optimization Towards Exploitable Maps", Mazzini et al., IEEE International Symp. on Circuits and Systems, Geneva, Vol. 1, pp. 723, (2000).

The inherent capability of generating a large space of (PN) sequences due to sensitivity dependence on initial conditions has been the main reason for exploiting chaos in spread spectrum communication systems. Certain one-dimensional chaotic maps exhibit this property and have been mathematically shown to provide a rich set of sequences when their output is recursively fed back into the map. This is discussed in:

"Chaos: An Introduction To Dynamical Systems", Alligood et al., Springer, N.Y. (1997); and "Chaotic Electronics in Telecommunications", CRC Press, Boca Raton, Fla., (2000).

Sequences generated in this way diverge to different trajectories in a few itterations even though their initial conditions differ by less than one percent. This behavior demonstrates that it is straight forward to generate a large space of (PN) sequences with nice statistical properties by quantizing the output of an itterative chaotic map. However, reliable electronic hardware implementations of chaos-based (PN) sequence generators based on recursion maps realized by piece-wise linear analog functions and output quantization have not been possible because of manufacturing problems, such as process variations among different integrated circuit production lots, transistor mismatches, and electronic noise. The problem of repeatable and consistent (PN) sequence generation has recently been addressed in the literature and an approach has been presented based on suppressing the potential process and mismatch errors by coarsely quantizing the inputs and outputs of maps. This is discussed in:

"Chaotic Generation of (PN) Sequences", Dornbusch et al., IEEE Intl. Symp. on Circuits and Systems, Orlando, Vol. V, pp. 454, (1999).

The problem which develops under this approach is that only a relatively small number of input/output bits for a single map stage are possible because of the coarseness of the quantization. A large number of cascaded map stages are thus required to generate long sequences and a rich sequence space. This leads to increased system complexity.

Additional known relevant references are:

"Fully Programmable, Scalable Chaos Based (PN) Sequence Generation", IEE Electronics Letters, Vol. 36, No. 16, pp. 1371, (2000); and "CDMA Engineering Handbook", Miller et al., Artech House, Norwood, Mass. (1998).

A Search of Patents has identified some which are generally relevant, none of which, however, are thought to be particularly on-point. Said Patents are:

U.S. Pat. No. 5,519,736 to Ishida;
U.S. Pat. No. 5,910,907 to Chen et al.;
U.S. Pat. No. 5,566,099 to Shimada;
U.S. Pat. No. 5,068,872 to Schroter;
U.S. Pat. No. 5,291,555 to Cuomo et al.;
U.S. Pat. No. 5,796,776 to Lomp et al.;
U.S. Pat. No. 4,852,023 to Lee et al.;
U.S. Pat. No. 6,031,865 to Kelton et al.;
U.S. Pat. No. 5,943,361 to Gilhousen et al.;
U.S. Pat. No. 6,148,053 to Ozluturk.

In particular, no identifed prior art suggests application of directly quantized maps.

Need remains for improved systems and method for generating robust (PN) sequences and rich (PN) sequence space.

DISCLOSURE OF THE INVENTION

The present invention teaches a novel system for chaos based psuedo-noise (PN) sequence generation. The approach is based on creating digital representations of analog output/input chaotic maps by directly quantizing said maps in order to enable realization of very simple, scalable, and initial condition programmable circuits that exhibit good chaotic behavior while maintaining the robustness associated with digital realizations. It is noted that "direct" quantization indicates that the mapping function itself is quantized, rather than being analog-type piece-wise linear. (See FIGS. 3a, 3b and 3c for diagramatic representation of directly quantized mapping functions). Present inventions systems can be applied to generate a large space of (PN) sequences with arbitrary lengths, utilizing a wide variety of architectures and a relatively simple, fully digital implementation. It should be appreciated that quantized maps form the basic cell building block for present (PN) Generator systems.

A very basic version of present invention psuedo-noise (PN) sequence generator then comprises N stages, each of said N stages comprising a digital chaotic map cell having input means and output means, which digital chaotic map cell performs a quantized output/input mapping function such that a binary input thereto results in a binary output therefrom. The output/input mapping function is a directly quantized version of an analog output/input map such as a selection from the group consisting of:
  tent;
  single ramp and
  multiple ramp.

As a more detailed introduction to a present invention N stage psuedo-noise (PN) sequence generator system, (where N is at least 2), it should be appreciated that first and second stages thereof can each comprise:
  digital chaotic map cell having input means and output means, which digital chaotic map cell performs a directly quantized output/input mapping function;
  combiner means which comprises first and second input means, and output means; and
  m-bit shift register having input means and parallel output means and series output means;

which psuedo-noise (PN) sequence generator system further comprises a quantizer having input and output means.

Said output means of said quantizer is functionally connected to the input means of said first m-bit shift register, and said parallel output means of each of the (N−1) m-bit shift registers being functionally connected to the first input means of the corresponding combiner means. The series output means of said first stage m-bit shift register being functionally connected to the input means of the second n-bit shift register; and the output of said second digital chaotic map cell being functionally connected to the second input of the first combiner means. The output of the first combiner means being functionally connected to the input of the first digital chaotic map cell; and the output means of said first digital chaotic map cell being functionally connected to said input means of said quantizer. In use:
  a. each of said N, m-bit shift registers, is loaded with an initial m-bits; and
  b. the parallel output of each of the first and second m-bit shift registers provides input to first input means of the first and second combiner means respectively, to which it is functionally connected; and such that:
  c. said first and second combiner means each, in response to input(s) thereto, provides an output which is input to said input means of said corresponding first and second digital chaotic map cell, respectively, which first digital chaotic map cell outputs at least one bit which is input to the quantizer input means, such that said quantizer, in response, produces a string of at least a one output bit(s), one bit of said string of at least one output bit(s) being a first psuedo-noise sequence output bit, and one bit of said string of at least one output bit(s) is input to the input means of the said first m-bit shift register, thereby sequentially causing bit shifting in each of said N m-bit shift registers so that each of the N combiner means, respectively, provides new input to each of the N digital chaotic map cells, to the end that a new input bit is caused to enter said input means of said quantizer;

such that the quantizer output means outputs a psuedo-noise sequence of at least one bit(s).

The Nth stage comprises, in functional combination:
  a digital chaotic map cell having input means and output means, which digital chaotic map cell performs a directly quantized output/input mapping function;
  a combiner means comprising at least one input means, and an output means;
  an m-bit shift register having input means and at least one selection from the group consisting of:
    parallel output means; and
    series output means;

where a parallel output provides simultaneous access to a plurality of bits, and a series output sequentially provides access to bits output from said m-bit shift register.

Continying, as mentioned, said psuedo-noise (PN) sequence generator comprises a quantizer having input and output means. Said output means of the quantizer is directly, for N=1, or indirectly through at least a first m-bit shift register for N>1, functionally connected to the input means of said Nth stage m-bit shift register, and at least one selection from the group consisting of:
  parallel output means; and
  series output means;

of said Nth stage m-bit shift register is functionally connected to said first input of the Nth stage combiner means; and optionally a selection from the group consisting of:
  series output means; and
  parallel output means;

output means of said Nth stage m-bit shift register is functionally connected to a second input means of said combiner means.

The output means of said Nth stage combiner means is functionally connected to said input means of said digital chaotic map cell; and the output means of said Nth stage digital chaotic map cell is directly, for N=1, or indirectly through at least a first digital chaotic map cell for N>1, functionally connected to said input means of said quantizer. In use:
  a. said Nth stage m-bit shift register, along with other present shift registers, are loaded with an initial m-bits; and
  b. said Nth stage m-bit shift register output provides input to the Nth stage combiner means;

such that:
  c. said Nth stage combiner means, in response to input(s) from said Nth stage m-bit shift register, provides an output which is input to said input means of said Nth stage digital chaotic map cell, which Nth stage digital chaotic map cell outputs at least one bit which causes a bit to be input to the quantizer input means, such that said quantizer, in response, produces a string of at least one output bit(s), one bit of said string of at least one output bit(s) being a first psuedo-noise sequence output bit, and one bit of said string of at least one output bit(s) causes input of a bit to the input means of the said Nth stage m-bit shift register, thereby sequentially causing bit shifting therein to the end that the bit sequence in the Nth stage m-bit shift register is changed thereby causing the Nth stage digital chaotic map cell to output at least one bit;

the result being that the quantizer output means outputs a psuedo-noise sequence of at least one bit(s).

It should be appreciated that the language:

"a combiner means comprising at least one input means, and an output means";

is used to provide generic applicability to combiner means in the last stage, as well as to earlier stages in a present invention psuedo-noise (PN) sequence generator. Specifically, it should be kept in mind throughout this Specification that a "combiner means" in other than the last, (ie. Nth), stage has first and second inputs which, during use, simultaneously receive input from a parallel output of an associated m-bit shift register and from an output of a next stage digital chaotic map cell. The last (Nth) stage can also be configured to have two inputs, but preferred practice is to provide only one input from the last (Nth) stage associated m-bit shift register to the Nth stage combiner means, which Nth stage combiner means, it must be understood, can be a means, which gate means can be nothing more than a wire connection directly between the input of the Nth stage digital chaotic map cell and the associated Nth stage m-bit shift register.

In addition it is specifically noted that the m-bit shift register at least one selection from the group consisting of:

parallel output means; and series output means;

indicates that outputs from an m-bit shift register are available that allow simultaneous access to a plurality of bits, and to a sequential stream of bits one by one. In the later case, such sequential bits typically feed into a m-bit shift register which provides a parallel output.

Moving along, more specifically a present invention psuedo-noise (PN) sequence generator system comprises at least one digital chaotic map cell having input means and output means, which digital chaotic map cell performs a directly quantized output/input mapping function. Given a digital input a present invention digital chaotic map cell provides a digital output. It is noted that Analog Mapping Cells which perform similar output/input functions are known, and provide such as a "tent" or "single or multiple ramp" mapping functions which are modeled by piece-wise linear lines. In the analog setting, within limits, any value of input can continuously provide any value of output, depending on the mapping function. The present chaotic mapping cell, however, provides mapping functions which "step" from one level to another, and to the Inventor's knowledge such a Directly Quantized digital chaotic mapping cell has not been previously known or reported. For additional insight it is noted that digital quantization can be visualized as providing a set of "stair steps" rather than a continuous ramp, for instance. As a functional example, given an eight bit input, then any of 256 input values, (ie. $2^8=256$), are possible, and likewise, assuming a single ramp digital chaotic map cell, it functions to return any of 256 output values. Similar Analog maps provide a continuum of inputs and outputs, within limits. If a dual ramp or tent mapping function is involved, some of the output values are, of course, "degenerate" in the sense that a single output value is provided for more than one input value.

Continuing, as a simple example, it should be appreciated that a present invention single stage psuedo-noise (PN) sequence generator system can be described as comprising:

a digital chaotic map cell having input means and output means, which digital chaotic map cell performs a directly quantized output/input mapping function;

a combiner means comprising at least first input means, and an output means;

an m-bit shift register having input means having at least on selection from the group consisting of:

parallel output means; and series output means; and a quantizer having input and output means.

In said single stage psuedo-noise (PN) sequence generator system the output means of said quantizer is functionally connected to the input means of said m-bit shift register. Further, said parallel output means or said series output means of said m-bit shift register is functionally connected to the first or second input means of said combiner means. Note that, as in all but the "last" stage of a present invention psuedo-noise (PN) sequence generator system, the parallel output means of the m-bit shift register can be functionally connected to the first input means of the associated stage combiner means, and the series output means of the m-bit shift register and simultaneously be functionally connected to the second input means of the associated combiner means, but in a "last" stage of a present invention psuedo-noise (PN) sequence generator system it is preferred that the combiner be what might be termed a "gate" which functionally provides only one connection between the associated m-bit shift register and the combiner means. In fact, the combiner means of the last stage can be substantially nothing more than a direct connect wire. Continuing, in the presently described single stage system, said output means of said combiner means is functionally connected to said input means of said digital chaotic map cell, and said output means of said digital chaotic map cell is functionally connected to said input means of said quantizer. In use said m-bit shift register is loaded with an initial m-bits; and said m-bit shift register provides input to the combiner means first and/or second input means. This leads to said combiner means, in response to inputs from the parallel and/or series outputs of said m-bit shift register, providing an output which is input to said input means of said digital chaotic map cell, which digital chaotic map cell outputs at least one bit which is input to the quantizer input means, such that said quantizer, in response, produces a string of at least a one output bit(s), one bit of said string of at least one output bit(s) being a first psuedo-noise sequence output bit. Further, one bit of said string of at least one output bit(s) is input to the input means of the said m-bit shift register, thereby sequentially causing bit shifting therein to the end that the last bit in the m-bit shift register is caused to exit said sequential output thereof, such that the quantizer output means outputs another psuedo-noise sequence bit. Of course, this is repeated at least twice, and typically many times to provide any length string of psuedo-noise desired.

It is emphasized that in the present invention single stage system the preferred combiner means comprises a single direct functional connection between the m-bit shift register and the digital chaotic map cell, (ie. it is a gate which selects a parallel or series output of the m-bit shift register, or can be but a simple a wire).

A two stage psuedo-noise (PN) sequence generator system can be described as comprising:
first and second digital chaotic map cells each having input means and output means, which digital chaotic map cells each perform directly quantized output/input mapping functions;
first and second combiner means, which each comprise at least one input means and an output means;
first and second m-bit shift registers, each having input means and at least one selection from the group consisting of:
parallel output means; and
series output means; and
a quantizer having input and output means.

As before, the output means of said quantizer is functionally connected to the input means of said first m-bit shift register; the parallel output means of said first m-bit shift register is functionally connected to the first input means of said first combiner means. A series output means of said first m-bit shift register is functionally connected to the input means of said second m-bit shift register. The output means of said first combiner means is functionally connected to said input means of said first digital chaotic map cell, and the output means of said first digital chaotic map cell is functionally connected to said input means of said quantizer. Further, a parallel output means or series output means of said second m-bit shift register is functionally connected to an input means of said second combiner means. As in the single stage case, a parallel output of the second stage m-bit shift register can be functionally connected to a first input means of said second stage combiner means and simultaneously a series output means of said second m-bit shift register be functionally connected to a second input means of said second combiner means, but preferred practice is to use only one of said connections. The output means of said second combiner means is functionally connected to said input means of said second digital chaotic map cell; and the output means of said second digital chaotic map cell is functionally connected to said second input means of said first combiner means. (Note, the input means and output means of the second stage combiner means can be simply ends of a wire which provides functional interconnection. That is the terminology "combiner means" can encompass a modulo-2 adder or a hard wire connection, and other systems). In use said first and second m-bit shift registers are loaded with an initial m-bits; and said first and second m-bit shift register outputs provide, respectively, input to the first and second combiner means, in response to inputs to said inputs each of the first and second combiner means provides an output which is input to said input means of said first and second digital chaotic map cell, respectively, which first digital chaotic map cell outputs at least one bit which is input to the quantizer input means, such that said quantizer, in response, produces a string of at least a one output bit(s), one of said string of at least one output bit(s) being a first psuedo-noise sequence output bit, and one bit of said string of at least one output bit(s), (can be the same psuedo-noise (PN) sequence bit just identified), is input to the input means of the said first m-bit shift register, thereby sequentially causing bit shifting in said first and second m-bit shift registers. As in the single stage case said procedure is typically repeated at least once such that the quantizer output means outputs a psuedo-noise sequence of more than one bit(s).

At least the first combiner means preferably comprises:
summation-and-divide-by-two means;
m-bit shift register accessed by said second input thereto;
means for accepting m-bits from said first input thereto;

such that in use each said summation-and-divide-by-two means is provided binary inputs from both said:
m-bit shift register accessed by said second input thereto; and
means for accepting m-bits from said first input thereto;

and provides an m-bit binary half-sum thereof at its output.

For insight, three, four and "N" stage present invention psuedo-noise (PN) sequence generator system will also be recited, but it is to be understood that any number of stages can be present and remain within the scope of the present invention.

A three stage psuedo-noise (PN) sequence generator system comprises:
first, second and third digital chaotic map cells each having input means and output means, which digital chaotic map cells each perform directly quantized output/input mapping functions;
first, second and third combiner means, which each comprise at least first input means and an output means;
first, second and third m-bit shift registers, each having input means and at least one selection from the group consisting of:
parallel output means; and
series output means; and
a quantizer having input and output means.

The output means of said quantizer is functionally connected to the input means of said first m-bit shift register. The parallel output means of said first m-bit shift register is functionally connected to the first input means of said first combiner means; and said series output means of said first m-bit shift register is functionally connected to the input means of said second m-bit shift register. The output means of said first combiner means is functionally connected to said input means of said first digital chaotic map cell, and said output means of said first digital chaotic map cell is functionally connected to said input means of said quantizer. Continuing, the parallel output means of said second m-bit shift register is functionally connected to the first input means of said second combiner means; and the series output means of said second m-bit shift register is functionally connected to the input means of said third m-bit shift register. The output means of said second combiner means is functionally connected to said input means of said second digital chaotic map cell. The output means of said second digital chaotic map cell is functionally connected to said second input means of said first combiner means. A parallel or serial output means of said third m-bit shift register is functionally connected to the first or second input means of said third combiner means. The output means of said third combiner means is functionally connected to said input means of said third digital chaotic map cell; and said output means of said third digital chaotic map cell is functionally connected to said second input means of said second combiner means. In use said first, second and third m-bit shift registers are loaded with an initial m-bits; and said first, second and third m-bit shift register parallel outputs provide, respectively, input to the first, second and third combiner means first input means. The result is that said first, second and third combiner means, in response to inputs thereto, each provide an output which is input to said input means of said first, second and third digital chaotic map cell, respectively. The first digital chaotic map cell outputs at least one bit which is input to the quantizer input means, such that said quantizer, in response, produces a string of at least one output bit(s), one bit of said string of at least one output bit(s) being a first psuedo-noise sequence output bit, and one bit of said string of at least one output bit(s) being input to the input means of the said first m-bit shift register, thereby sequentially causing bit shifting in said first, second and third m-bit shift registers. Said procedure is typically repeated many times such that the quantizer output means outputs a psuedo-noise sequence of at least one bit(s), and typically many bits.

The preferred first and second combiner means can each comprise:
  summation-and-divide-by-two means;
  m-bit shift register accessed by said second input thereto;
  means for accepting m-bits from said first input thereto;

such that in use each said summation-and-divide-by-two means is provided binary inputs from both said:
  m-bit shift register accessed by said second input thereto;
  means for accepting m-bits from said first input thereto;

and provides an m-bit binary half-sum thereof at its output.

The preferred third combiner means is a gate, or hard wire connection for providing one output from the third m-bit shift register to the third digital chaotic map cell.

A four stage psuedo-noise (PN) sequence generator system comprising:
  first, second, third and fourth digital chaotic map cells each having input means and output means, which digital chaotic map cells each perform directly quantized output/input mapping functions;
  first, second, third and fourth combiner means which each comprise at least a first input means, and an output means;
  first, second, third and fourth m-bit shift registers, each having input means and at least one selection from the group consisting of:
    parallel output means; and
    series output means; and
  a quantizer having input and output means.

The output means of said quantizer is functionally connected to the input means of said first m-bit shift register. The parallel output means of said first m-bit shift register is functionally connected to the first input means of said first combiner means; and said series output means of said first m-bit shift register is functionally connected to the input means of said second m-bit shift register. Said output means of said first combiner means is functionally connected to said input means of said first digital chaotic map cell, and said output means of said first digital chaotic map cell is functionally connected to said input means of said quantizer. The parallel output means of said second m-bit shift register is functionally connected to the first input means of said second combiner means; and said series output means of said second m-bit shift register is functionally connected to the input means of said third m-bit shift register. The output means of said second combiner means is functionally connected to said input means of said second digital chaotic map cell, and said output means of said second digital chaotic map cell is functionally connected to said second input means of said first combiner means. The parallel output means of said third m-bit shift register is functionally connected to the first input means of said third combiner means; and the series output means of said third m-bit shift register is functionally connected to the input means of said fourth m-bit shift register. The output means of said third combiner means is functionally connected to said input means of said third digital chaotic map cell, and said output means of said third digital chaotic map cell is functionally connected to said second input means of said second combiner means. The parallel output means and/or the series output means of said fourth m-bit shift register is functionally connected to the first and/or second input means of said fourth combiner means. (Note it is within the scope of the present invention to provide functional connection between the parallel output of the fourth m-bit shift register to the first input means of the fourth combination means, and the serial means of the fourth m-bit shift register to the second input means of the fourth combination means, however, preferred practice is to provide a direct functional connection between one output of the fourth m-bit shift register and the input of the fourth digital chaotic map cell). The output means of said fourth combiner means is functionally connected to said input means of said fourth digital chaotic map cell, and the output means of said fourth digital chaotic map cell is functionally connected to said second input means of said third combiner means. In use said first, second, third and fourth m-bit shift registers are each loaded with an initial m-bits; and said first, second, third and fourth m-bit shift register outputs provide input(s) to the first, second, third and fourth combiner means input means such that said first, second, third and fourth combiner means, in response to inputs thereto, each provide an output which is input to said input means of said first, second, third and fourth digital chaotic map cell, respectively, which first digital chaotic map cell, in response, outputs at least one bit which is input to the quantizer input means, such that said quantizer, in response, produces a string of at least one output bit(s), one bit of said string of at least one output bit(s) is a first psuedo-noise sequence output bit, and one bit of said string of at least one output bit(s), (which can be the same bit as a psuedo-noise (PN) bit just identified), is input to the input means of the said first m-bit shift register, thereby sequentially causing bit shifting in said first, second, third and fourth m-bit shift registers. Said procedure is typically repeated many times such that the quantizer output means outputs a psuedo-noise sequence of at least one bit(s), and typically many such bits.

The preferred first, second and third combiner means can each comprise:
  summation-and-divide-by-two means;
  m-bit shift register accessed by said second input thereto;
  means for accepting m-bits from said first input thereto;

such that in use each said summation-and-divide-by-two means is provided binary inputs from both said:
  m-bit shift register accessed by said second input thereto;
  means for accepting m-bits from said first input thereto;

and provides an m-bit binary half-sum thereof at its output.

As described for the last stage of the two and three stage systems, the preferred fourth combiner means is a gate, or hard wire connection for providing one output from the third m-bit shift register to the fourth digital chaotic map cell.

It should be apparent that an output means of a last m-bit shift register is functionally connected to an input means of the associated last combiner means, rather than to the input of the sequentially next m-bit shift register, as is the case with preceding stage m-bit shift register outputs. Hence when a stage is added a sequential output of the last then existing stage m-bit shift register is disconnected from the input of the then last existing combiner means and another stage comprised of:

a digital chaotic map cell having input means and output means, which digital chaotic map cell performs a directly quantized output/input mapping function;

a combiner means comprising at least a first input means, and an output means;

an m-bit shift register having input means and parallel output means and series output means;

is added, with an output means of the new m-bit shift register then being functionally connected to an input means of the added combiner means.

From the above recitation, it should be obvious that any number of stages can be added to a present invention psuedo-noise (PN) sequence generator system, and in general N stages can be present. In general, a present invention N stage psuedo-noise (PN) sequence generator system comprises:

N digital chaotic map cells each having input means and output means, which digital chaotic map cells each perform directly quantized output/input mapping functions;

N combiner means which each comprise at least a first input means, and an output means;

N m-bit shift registers, each having at least one input means and at least one selection from the group consisting of:
  parallel output means; and
  series output means; and a quantizer having input and output means.

The output means of said quantizer is functionally connected to the input means of said first m-bit shift register, and said parallel output means of each of the first to the (N−1th) m-bit shift register being functionally connected to the first input means of the corresponding Nth combiner means. The series output means of said 1st m-bit shift register being functionally connected to the input means of the (N−(N−2)) m-bit shift register; and the series output means of said (N−(N−2) m-bit shift register being functionally connected to the input means of the (N−(N−3)) m-bit shift register. This progression continues to the point that the series output means of the (N−1)th m-bit shift register is functionally interconnected to the input of the Nth m-bit shift register. A selection from the group consisting of:
  parallel output means; and
  series output means;

of said Nth m-bit shift register is functionally connected to a selection from the group consisting of:
  first input means; and
  second input means;

of said Nth combiner means.

The output means of said Nth combiner means is functionally connected to said input means of said Nth digital chaotic map cell, and said output means of said Nth digital chaotic map cell is functionally connected to said second input means of the (N−1)th combiner means. The output means of said (N−1)th combiner means is functionally connected to the input means of the (N−1) digital chaotic map cell, and the output means of said (N−1)th digital chaotic map cell is functionally connected to the second input means of the (N−2) combiner cell. The output means of said (N−2)th combiner means is functionally connected to the input means of the (N−2) digital chaotic map cell. This interconnection progression continues to the point that the output means of the (N−(N−2))th combiner means is functionally connected to the input means of the 1st digital chaotic map cell. The output means of said first digital chaotic map cell is functionally connected to said input means of said quantizer, such that in use:

a. each of said N, m-bit shift registers, is loaded with an initial m-bits; and b. each of the N, m-bit shift registers provides input to the first input means of the combiner means to which it is functionally connected; and such that:

c. said N combiner means each, in response to input(s) thereto, provides an output which is input to input means of said corresponding Nth digital chaotic map cell, respectively, which first digital chaotic map cell outputs at least one bit which is input to the quantizer input means, such that said quantizer, in response, produces a string of at least a one output bit(s), one of said string of at least one output bit(s) being a first psuedo-noise sequence output bit, and one bit of said string of at least one output bit(s) is input to the input means of the said first m-bit shift register, thereby sequentially causing bit shifting in each of said N m-bit shift registers, so that each of the remaining (N−1) combiner means, respectively, provides input to each of the remaining (N−1) m-bit shift registers;

such that the quantizer output means is caused to output a psuedo-noise sequence of at least one bit(s).

All but the Nth combiner means preferably each comprise:
  summation-and-divide-by-two means;
  m-bit shift register accessed by said second input thereto;
  means for accepting m-bits from said first input thereto;

such that in use each said summation-and-divide-by-two means is provided binary inputs from both said:
  m-bit shift register accessed by said second input thereto;
  means for accepting m-bits from said first input thereto;

and provides an m-bit binary half-sum thereof at its output.

The preferred Nth combiner means is a gate, or simply a wire for providing output from the Nth m-bit shift register to the input means of the Nth digital chaotic map cell.

A parallel psuedo-noise (PN) generating system comprises:
  A. at least two present invention psuedo-noise (PN) sequence generator systems as described above; and
  B. control or combiner means for controlling access to the quantizer output means of said psuedo-noise (PN) sequence generator systems.

With this version, each present psuedo-noise (PN) generator performs its function independently, and the control or combiner means determines contribution to the psuedo-noise (PN) sequence being generated.

A series psuedo-noise (PN) generating system comprises:
  A. at least one present invention psuedo-noise (PN) sequence generator systems as described above; and
  B. control means for selecting how many stages, N, the psuedo-noise (PN) sequence generator system comprises at a given time.

With this version, the control means determines the number of stages, N, of the (PN) sequence generator system at a time, which number of stages can change between generation of an Xth bit and an (X+1st) bit of a (PN) sequence.

A variation of the present invention system involves causing, at the step of loading initial conditions into an m-bit shift register (SRX), applying the output of a digital chaotic map cell associated with another m-bit shift register (SRY) to set the initial conditions in the m-bit shift register (SRX).

It is emphasized that a Combiner means, particularly which is not the last Nth stage, can be a binary summation system for adding inputs to the first and second inputs as previously described, while in a last stage the combiner means is preferably a gate or wire means functional interconnection to pass binary digits from only one input from an associated m-bit shift register, or can be a system for otherwise acting on the first and/or second inputs thereto.

A method of the present invention comprises the steps of:
a. providing a present invention psuedo-noise (PN) sequence generator system as described above;
b. loading initial bits into each of the m-bit sequential shift registers; and
c. accessing a stream of psuedo-noise (PN) output bits at the output means of said quantizer.

Finally, it should be appreciated that langauge such as:
"which first digital chaotic map cell, in response, outputs at least one bit which is input to the quantizer input means, such that said quantizer, in response, produces a string of at least one output bit(s), one bit of said string of at least one output bit(s) is a first psuedo-noise sequence output bit, and one bit of said string of at least one output bit(s), (which can be the same bit as a psuedo-noise (PN) bit just identified), is input to the input means of the said first m-bit shift register, thereby sequentially causing bit shifting in said first, second, third and fourth m-bit shift registers";

is not to be interpreted to preclude or limit the use of bit(s) output from the quantizer to one single bit. That is, the word "one" is not to be read as limiting, but to mean that while prefered practice utilizes one bit, more than one bit can utilized as described. Unless the result would be non-functional, this approach to language interpretation is to be generally applied throughout this Specification and claims.

The present invention will be better understood by reference to the detailed Description Section of this Specification, in conjunction with the Drawings.

SUMMARY OF THE INVENTION

It is therefore a purpose and/or objective of the present invention to teach a system which is comprised of "N" stages of directly quantized output/input map containing chaotic map cells.

It is another purpose and/or objective of the present invention to teach a method for generating psuedo-noise sequences utilizing a system which is comprised of "N" stages of directly quantized output/input map containing chaotic map cells, each thereof being in functional combination with combiner means, a shift register, which system further comprising a quantizer positioned to receive input from the first of the N stages.

Other purposes and/or objectives will become apparent by reference to the Specification and the claims.

DETAILED DESCRIPTION

The following is derived from a paper written by the Inventors, and is included to provide insight to present invention systems architecture and operations.

Figure 3A:
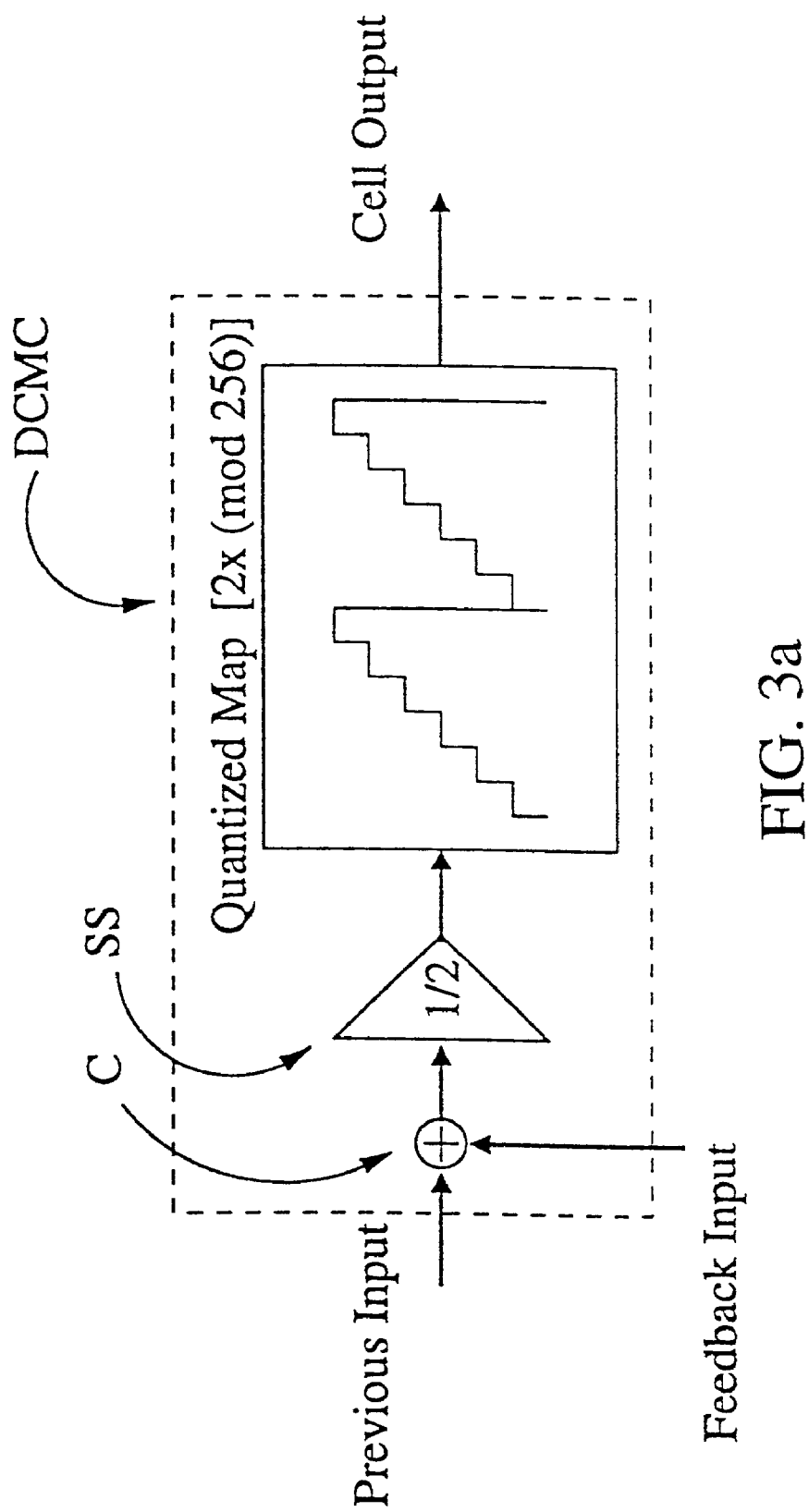
FIGS. 3a, 3b and 3c demonstrate, respectively, in the context of digital chaotic map cells, dual directly quantized ramp mapping, single ramp mapping and tent mapping functional characteristics.
Figure 3B:
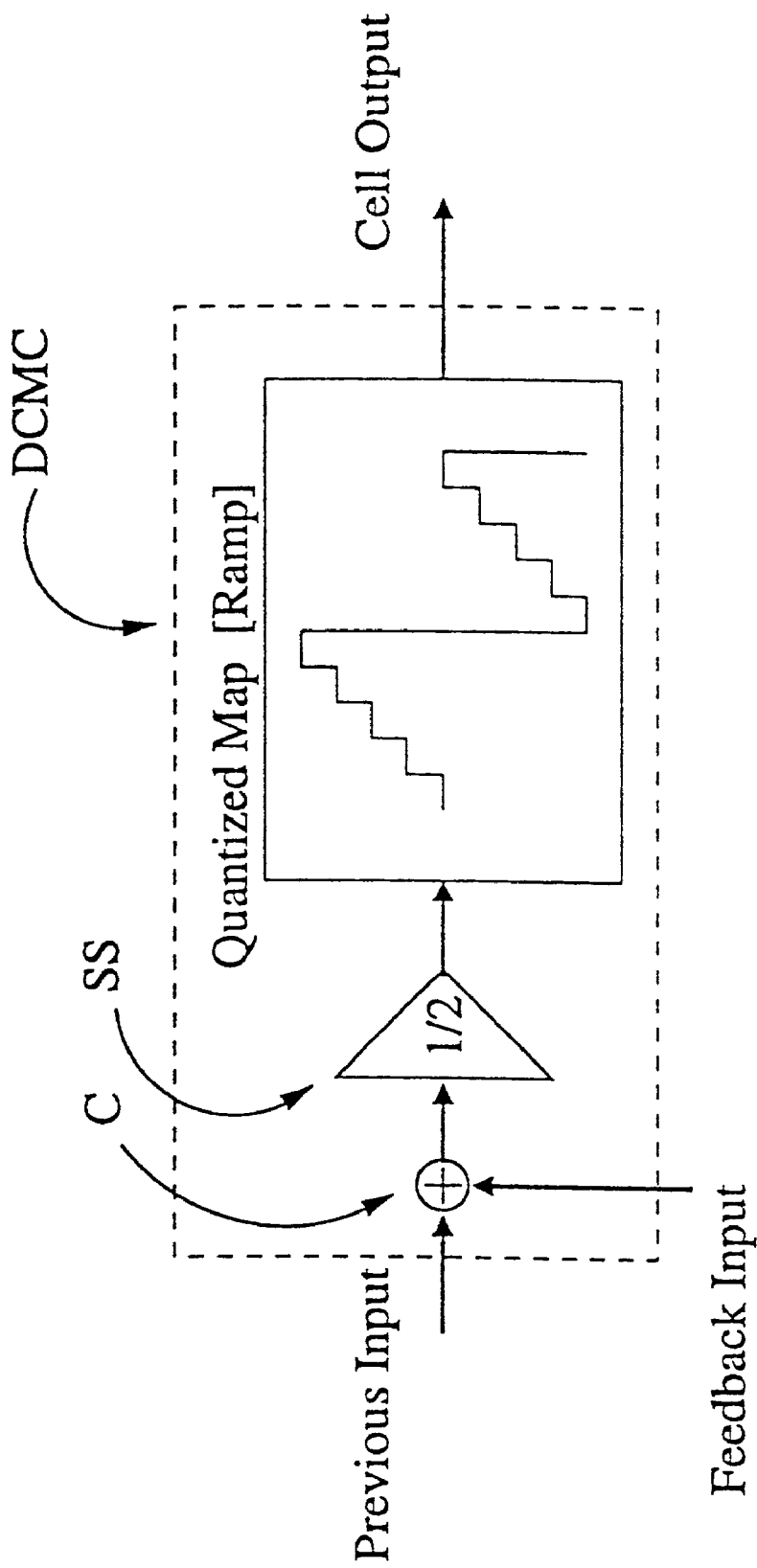
Figure 3C:
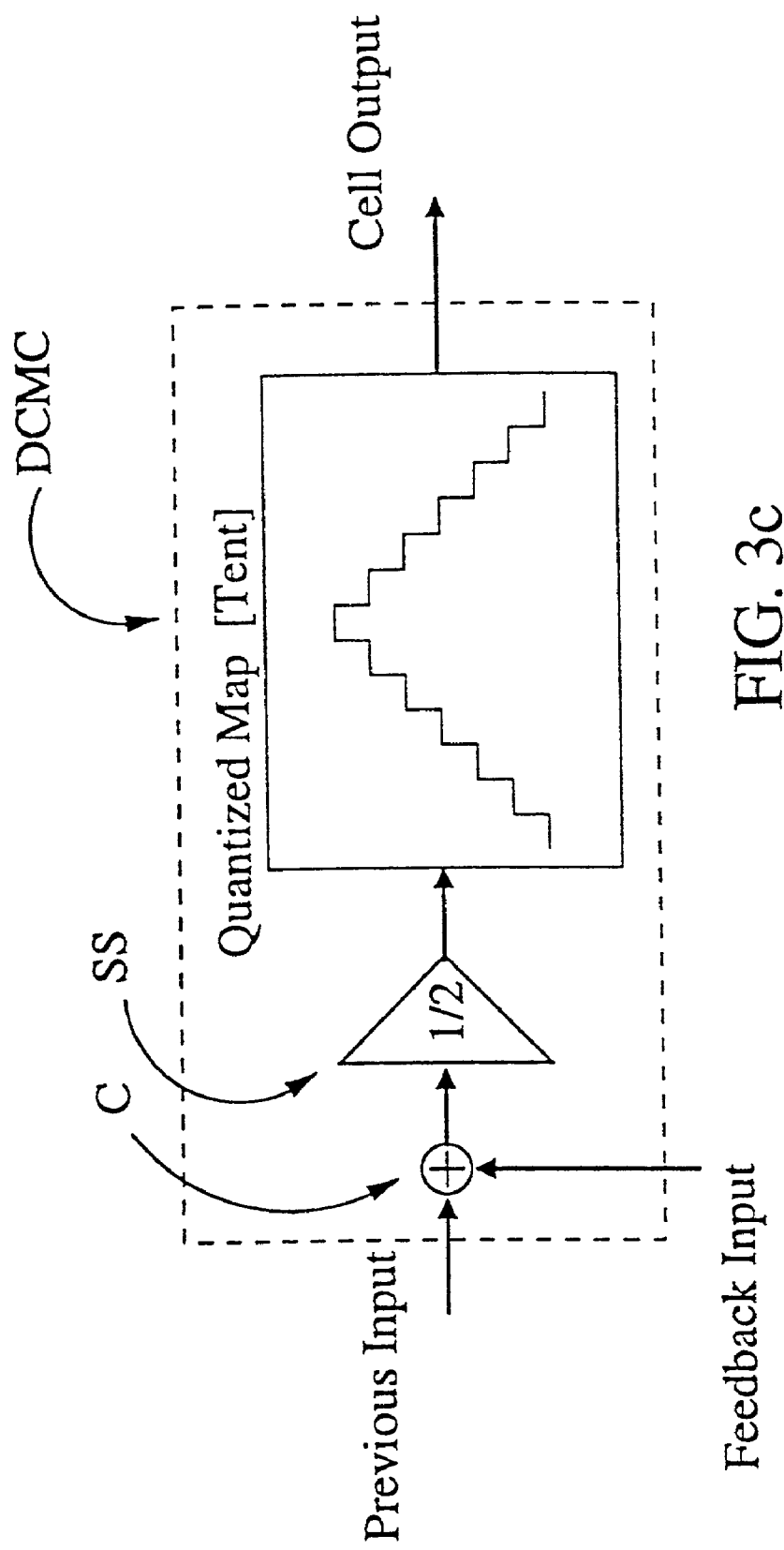

Present invention systems for repeatable chaos-based (PN) sequence generation result from application of digital chaotic map cells which are realized by direct, (ie. the output/input function is directly quantized as exemplified by FIGS. 3a, 3b and 3c, as compared to, for instance, quantizing an output signal which is processed by an output/input function map cell having a continuous analog characteristic), quantization of output/input maps. Applying said directly quantized maps as system building blocks enables fully digital realization of chaotic sequence generators which are initial condition programmable, scalable and robust in the face of manufacturing parameter variations and electronic noise.

Figure 1:
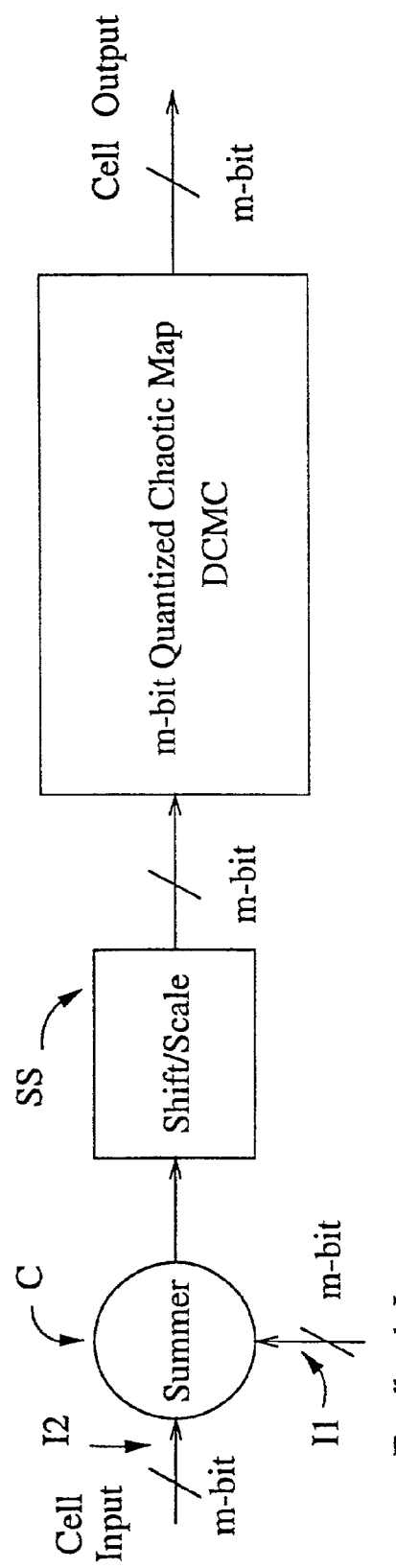
FIG. 1 shows a single chaotic cell using an m-bit directly quantized chaotic map cell.
Figure 2:
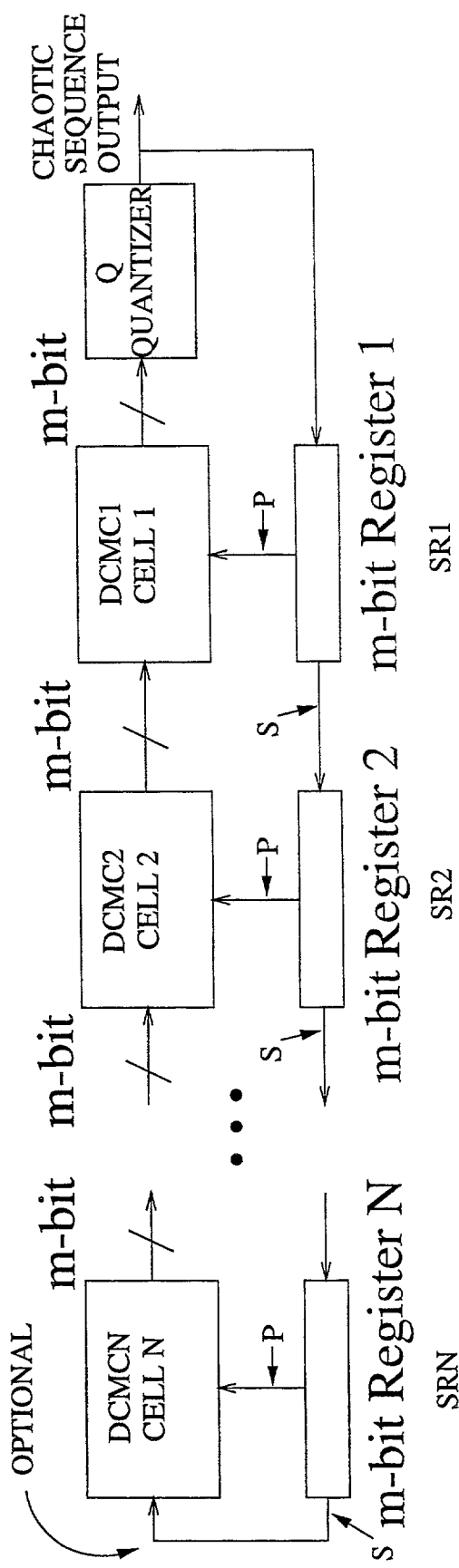
FIG. 2 shows a present invention "N" stage psuedo-noise (PN) sequence generator system, including shift registers (SR1) (SR2) and (SRN) in a feedback path.

Turning now to FIG. 1, there is shown a single digital chaotic map cell using an m-bit directly quantized chaotic map (DCMC). Also shown are a Combiner means (C) with First (I1) and Second (2nd) inputs. FIG. 1 shows a Shift/Scaler (SS) which is applied to control the m-bit string length, when, for instance, the Combiner means (C) adds two binary numbers and the result includes a carry-bit. Said Shift/Scaler (SS) can be a divide-by-two circuit. It is of benefit, at this time to note that FIG. 3a includes such a divide-by-two Shift/Scaler (SS), and further demonstrates a Dual Quantized Ramp Mapping which might characterize its output/input function, and that FIGS. 3b and 3c demonstrate Single Ramp and a Tent directly quantized mapping, which are two possible alternatives to the Dual Quantized Ramp Mapping shown in FIG. 3a. Other directly quantized mapping is also possible. It should be intuitively apparent that a small number of quantization levels allows realization of a present invention digital directly quantized chaotic map cell with minimal hardware complexity, however, it must also be appreciated that, in contrast to continuous coding ability in analog maps, a small number of quantization levels is associated with limited encoding capability. As will become apparent herein, the present invention improves the statistical properties of generated (PN) sequences by employing feedback in systems comprising cascades of digital chaotic map cells. FIG. 2 shows a present invention "N" stage psuedo-noise (PN) sequence generator system, including shift registers (SR1) (SR2) and (SRN) configured in such a non-linear feedback path. Note that the serial (S) output of m-bit shift register is optionally shown functionally connected to the Nth digital chaotic map cell, and it is emphasized that this is not preferred. The last stage of any present invention digital chaotic map cell (DCMCN) preferably has only one input, which can be the serial (S) or parallel (P) output of the Nth m-bit shift register (SRN). Which is elected will depend on the specific realization of a combiner means and what it is programmed to do. For instance, as one example, a combiner means might be configured to receive a plurality of input bits simultaneously from the associated m-bit shift register, or a combiner means might contain an internal m-bit shift register into which bits are sequentially entered, from which internal m-bit shift register a plurality of bits can be simultaneously accessed.

During a sequence initialization phase, the contents of present shift registers can be loaded with binary words that act as the initial condition inputs to m-bit directly quantized digital chaotic map cells, effectively yielding N×m programmable bits. Hence, present invention system design allows for directly exploiting the sensitive dependence of chaotic maps on such initial conditions. As long as the parameters for quantization and feedback scaling are properly chosen, simple implementations can give rise to very long and statistically well-behaved sequences. It is also noted that the present invention provides that in addition to the internal direct quantization of the maps in the digital quantized map cells, the output of the cascade of such cells can also be more coarsely quantized.

Figure 4:
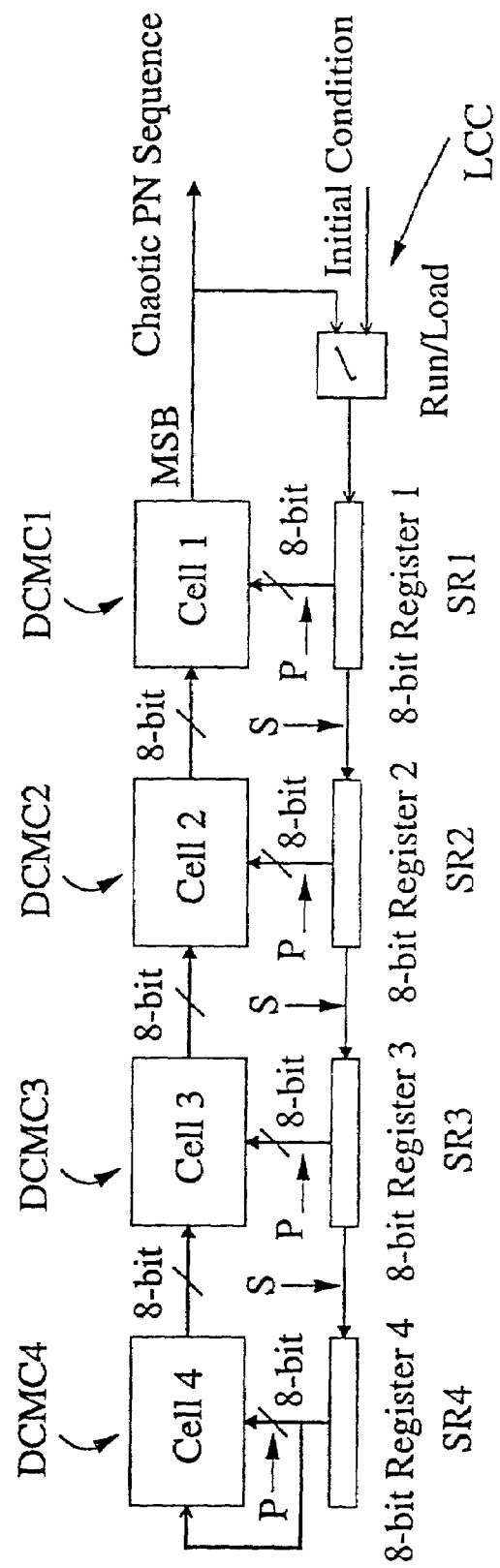
FIG. 4 shows a structure employing four cells with 32-bit initial condition.
Figure 5A:
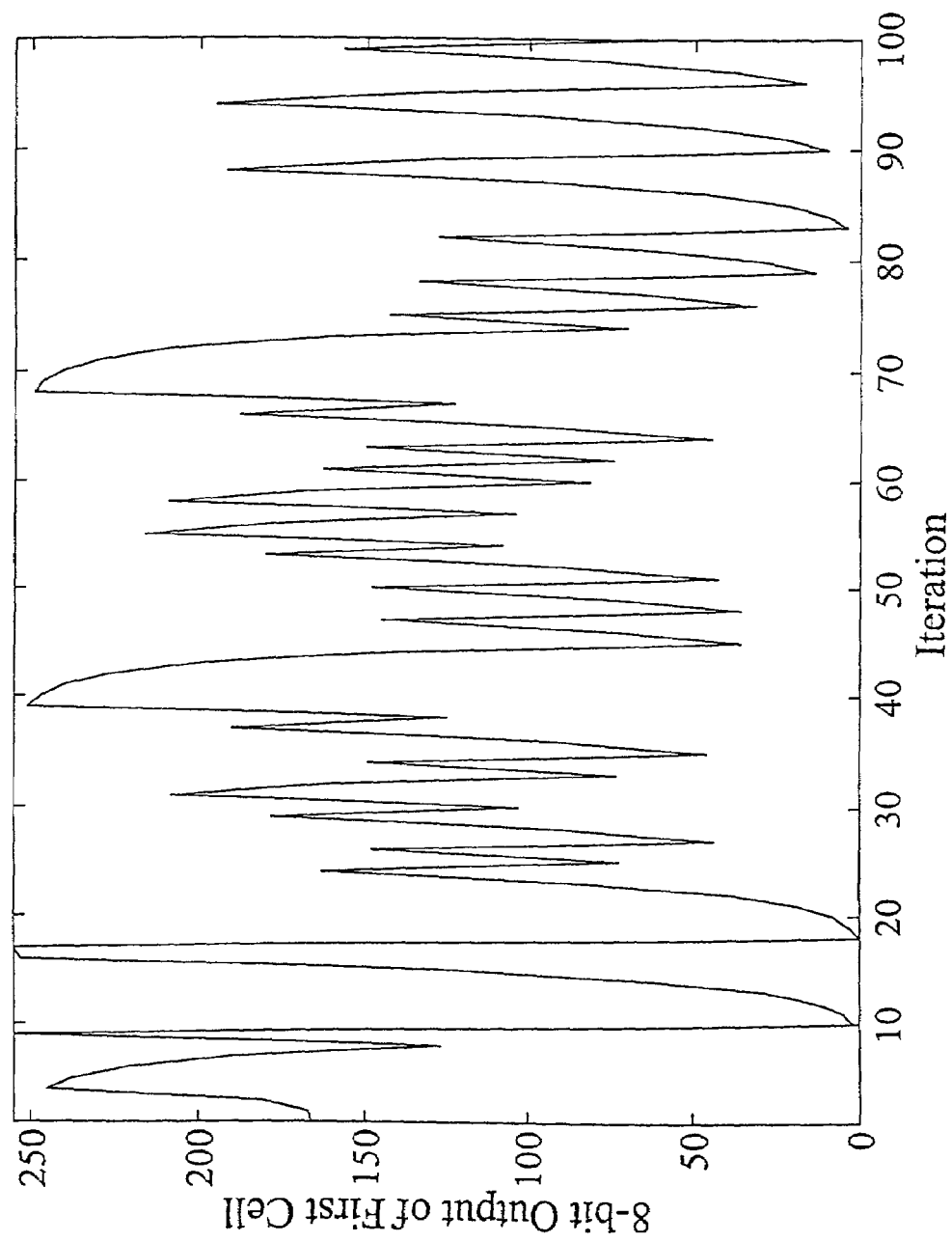
FIGS. 5a and 5b display a 100-long truncated sample trajectory pair generated by the four cell architecture, demonstrating the sensitive dependence on initial conditions.
Figure 5B:
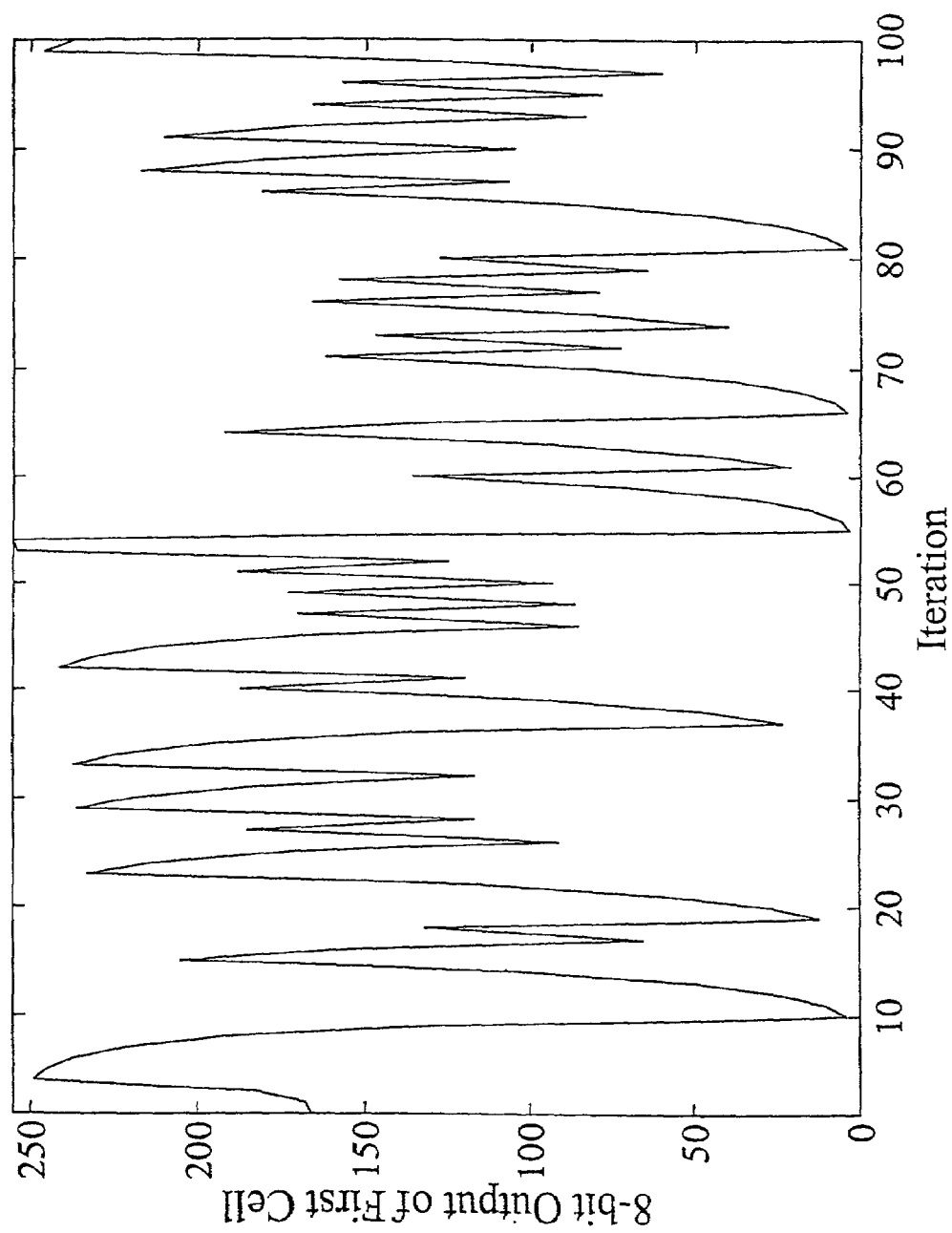
Figure 6A:
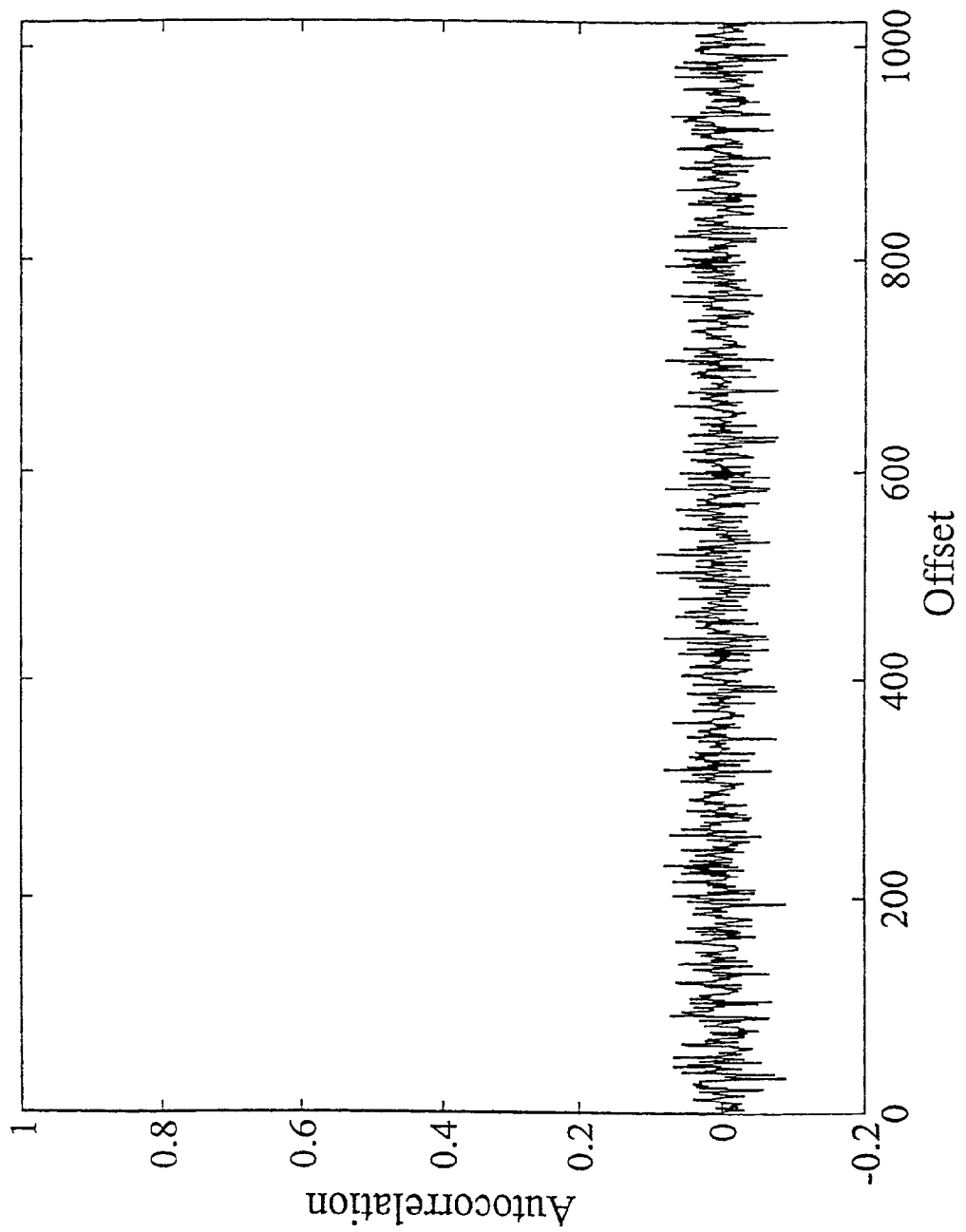
FIGS. 6a and 6b depict normalized auto-correlation and cross-correlation plots, respectively, for typical sequences generated by this architecture.
Figure 6B:
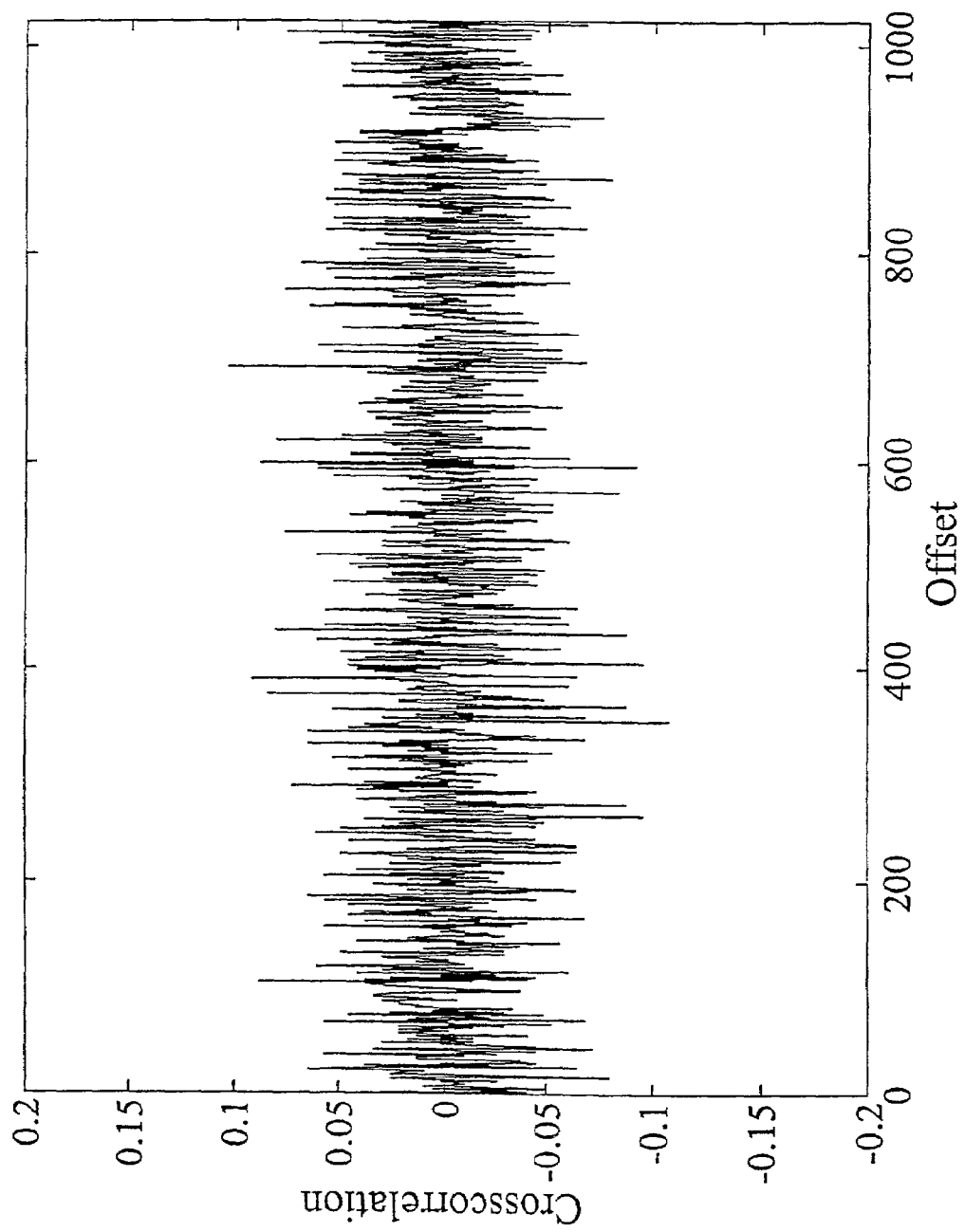

Herein, the 2× (modulus 1) map with 8-bit quantization is used to demonstrate validity of the present invention approach. It follows that the same map can be re-scaled as 2× (modulus 256) for full digital implementation. As mentioned, FIG. 3a shows a block diagram of a digital directly quantized chaotic cell using a quantized version of the 2× (modulus 1) map. Said digital directly quantized chaotic cell can be used in a present invention (PN) sequence generator system. The FIG. 3a digital directly quantized chaotic cell accepts inputs from a previous stage as well as from a feedback register with 8-bit data widths. In the present example, a multiple free scaling operation, (ie. divide by 2), is also performed for preserving the 8-bit data range in the overall architecture. Based on this cell, it is possible to generate arbitrarily long sequences by exploiting the scaleability feature of the direct quantization technique. For instance, a structure employing four digital quantized chaotic cells (DCMC1), (DCMD2), (DCMC3), (DCMC4), each with 32-bit initial condition is shown in FIG. 4. In the FIG. 4 structure the output quantization is achieved by taking the Most Significant Bit (MSB) of the output of first digital quantized chaotic cell (DCMC1) as the feedback bit, with the result being that binary chaotic (PN) sequences are yielded. It should be noted that this type of feedback results in a cascade of shift registers (SR1), (SR2) (SR3) and (SR4), which beneficially enables series initial condition programmability. In the FIG. 4 system, a logic circuit (LCC) is also present to provide controls for the initial condition loading and sequence generation modes. If longer sequences, or a larger number of sequences are required, said architecture can be scaled to allow for more cascades in a straight forward manner. The FIG. 4, four stage digital directly quantized chaotic cell architecture has been modeled at the logic gate level to show that the directly quantized realization retains the chaotic properties of the underlying original analog map. Several chaotic trajectory pairs that have one bit differences ranging from the Least Significant Bit (LSB) to the Most Significant Bit (MSB) in their initial conditions have been generated by taking the 8-bit output of cell 1 in FIG. 4. The trajectories have been observed to diverge quickly and remain that way for at least 4,000,000 iterations. FIGS. 5a and 5b display a 100-long truncated sample trajectory pair generated by the four digital directly quantized chaotic cell architecture, demonstrating the sensitive dependence on initial conditions. In this example, the LSB of the first digital directly quantized chaotic cell has been changed, whereas all other initial condition bits have been kept the same. Next, in order to access the statistical performance or the (PN) generator, the output sequences have been characterized with respect to their auto-correlation, cross-correlation and balance properties. For this purpose, 10,000 thirty-two (32)-bit initial conditions have been randomly generated and correlations of all the resulting sequence combinations have been tested to explore the sequence space. FIGS. 6a and 6b depict normalized auto-correlation and cross-correlation plots, respectively, for typical sequences generated by this architecture. The plots are based on truncated correlation computations using a window of length 1,024. In these simulations, all of the sequences exhibited the behavior shown in FIG. 6 while being fully balanced with respect to the one and zero counts in the sequence. In addition, 50 random initial conditions have been used to observe the long sequence generation capability of the architecture. In particular, 4,000,000-long (PN) sequences have been generated using the random initial conditions. All the resulting sequence combinations have been exhaustively tested for correlation and balance properties, which have yielded results similar to the truncated sequences.

Continuing, a number of hardware architectures utilizing directly quantized chaotic maps are possible utilizing structures which are easily cascaded and reconfigured into arbitrarily complex sequence (PN) sequence generators. The following distinct architectures:

Cascades with varying numbers of digital directly quantized chaotic map cell;

Parallel arrays of (PN) Sequence generators; and

Hierarchical Cascades of (PN) Sequence Generators;

are identified to provide insight into creation of complex (PN) sequences generators with Low Probability of Intercept (LPI) and multi-user security.

Regarding cascades with varying numbers of digital chaotic map cells, said architectures employ a scheme in which the number of digital directly quantized chaotic cells that are cascaded varies over short time periods. This can be achieved by employing another sequence generator whose initial condition vector determines the trajectory with which the number of cascades are controlled in a chaotic fashion.

Figure 7:
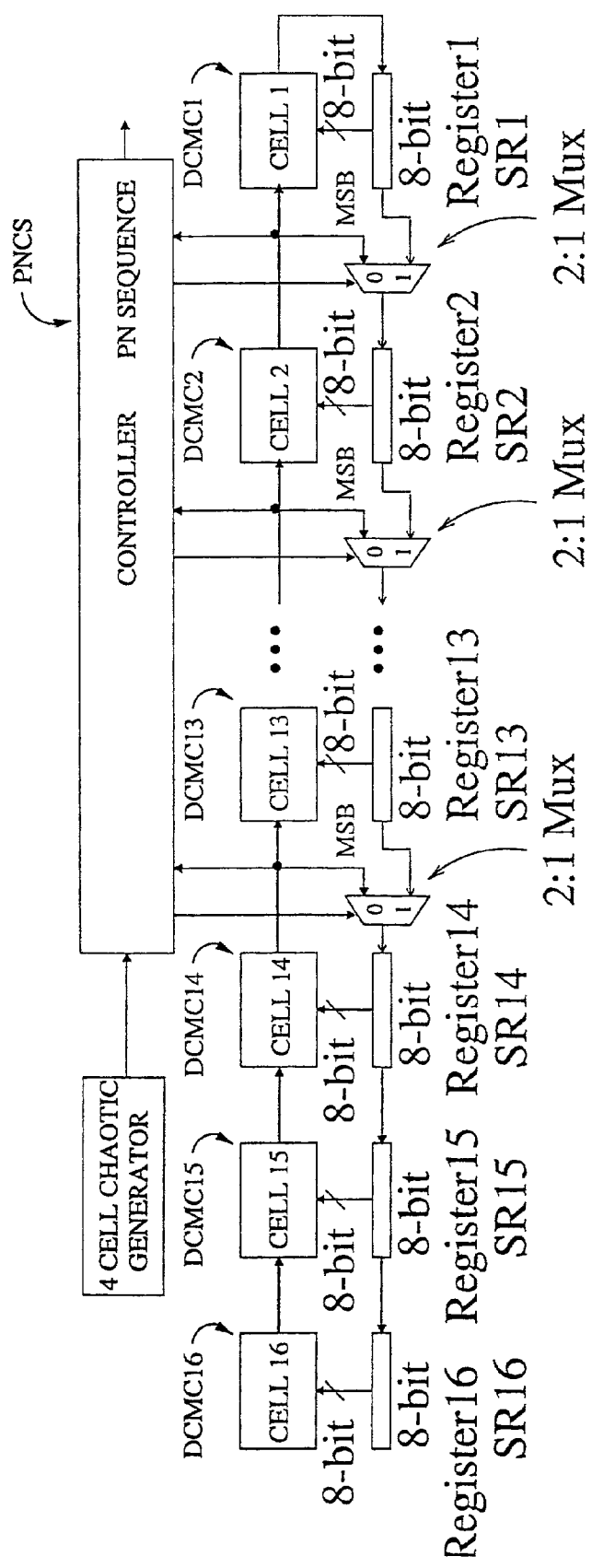
FIG. 7 demonstrates a system in which the number of cells that are cascaded varies over short time periods.

A representative scheme illustrating this concept is displayed in FIG. 7. The architecture in FIG. 7 is built around a logic controller driven by a (PN) sequence generator (PNCS). The (PN) sequence generator controller (PNCS) handles the configuration of interconnections among the various digital quantized chaotic cells (DCMC1) (DCMC2) . . . (DCMC3)–(DCMC16), with the number of cascades ranging between a minimum of three and a maximum of sixteen. It should be noted that the maximum number of digital directly quantized chaotic cells can be set arbitrarily high for more complexity.

Figure 8:
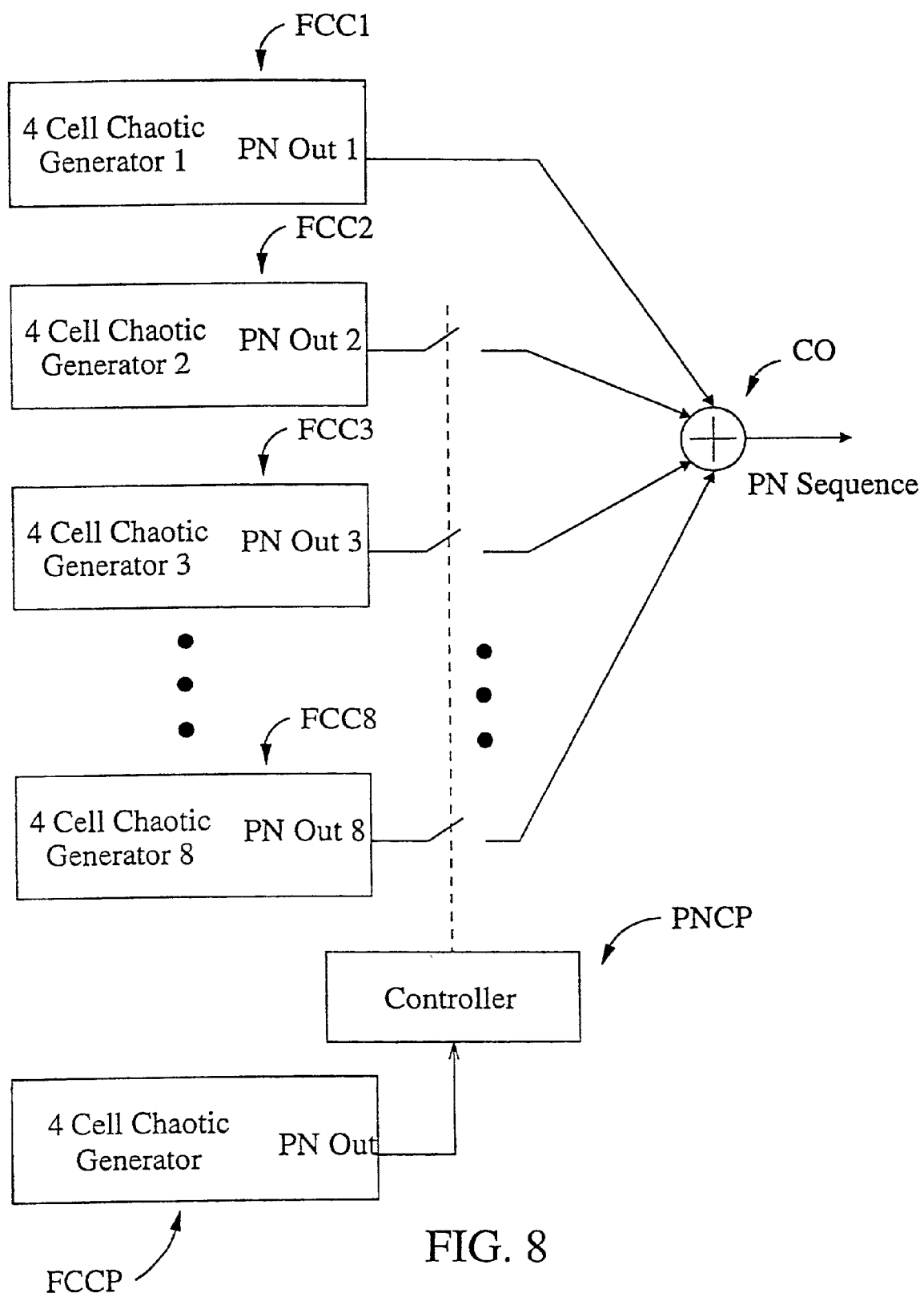
FIG. 8 shows the diagram of this scheme where a modulo-2 summation is performed at the output.

Regarding parallel arrays of (PN) Sequence generators, FIG. 8 shows a diagram of a scheme where a modulo-2 summation is performed at the output (CO). As in the cascaded architecture, a PN Sequence Generator Controller (PNCP) determines the contribution of each parallel (PN) generator to the final output by a chaotic trajectory, which is initial condition programmable. The maximum number of parallel (PN) sequence generators investigated to date is eight, (ie. (FCC1–FCC8), and it is to be noted that the number of parallel sequence (PN) generators contributing to the output at any time can be determined by another chaotic (PN) sequence generator (FCP).

Figure 9:
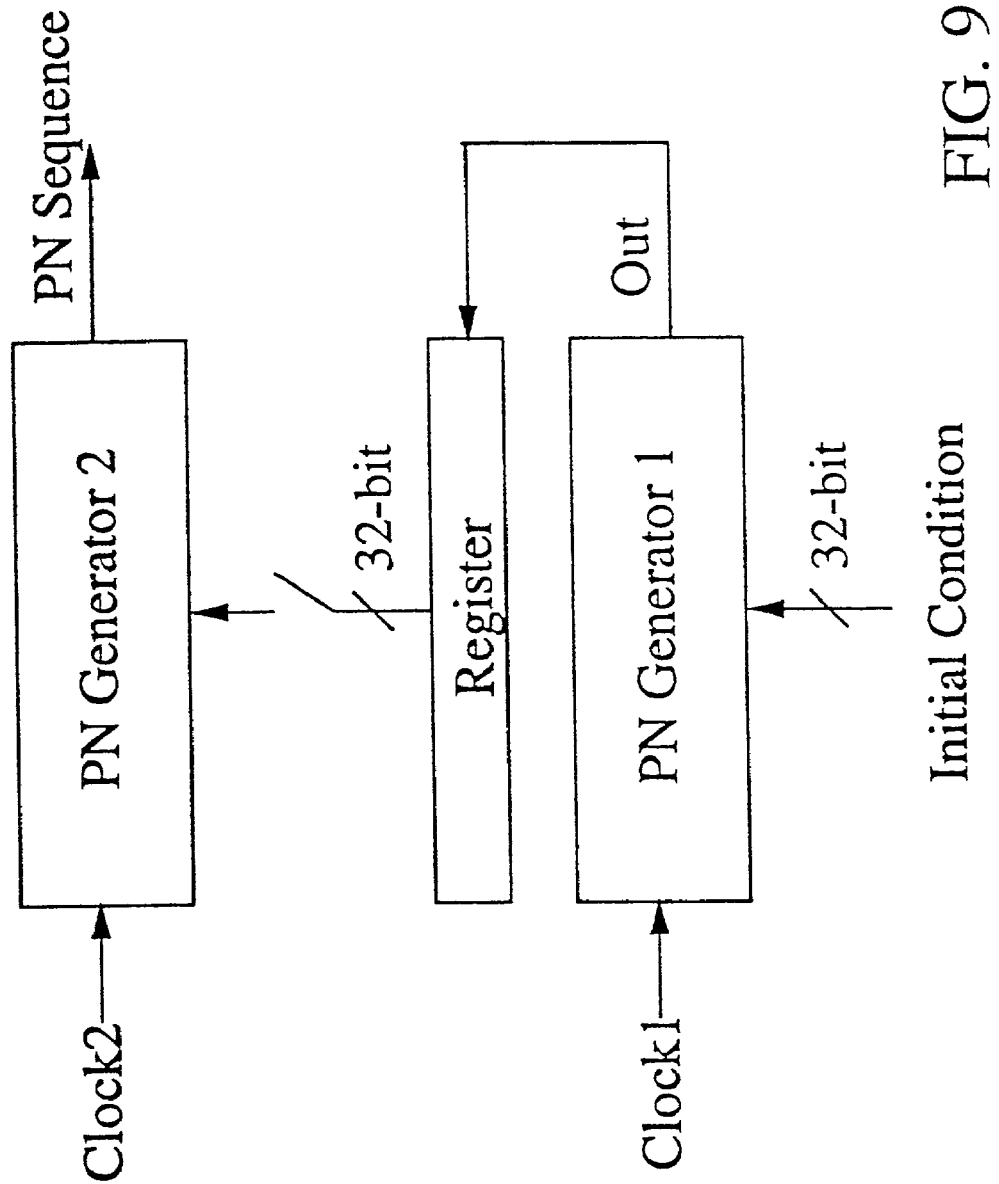
FIG. 9 shows that the output of a preceding (PN) sequence generator can be caused to load the initial condition register of a subsequent (PN) generator stage.

Regarding hierarchical cascades of (PN) Sequence Generators, FIG. 9 shows that the output of a preceding (PN) sequence generator can be caused to load the initial condition register of a subsequent (PN) generator stage. The serial initial condition programability of this architecture enables a cascade while the output stage is clocked at a chipping rate in order to generate different (PN) sequences. Language describing setting of initial conditions is to be interpreted to include such a non-limiting practice.

Figure 10A:
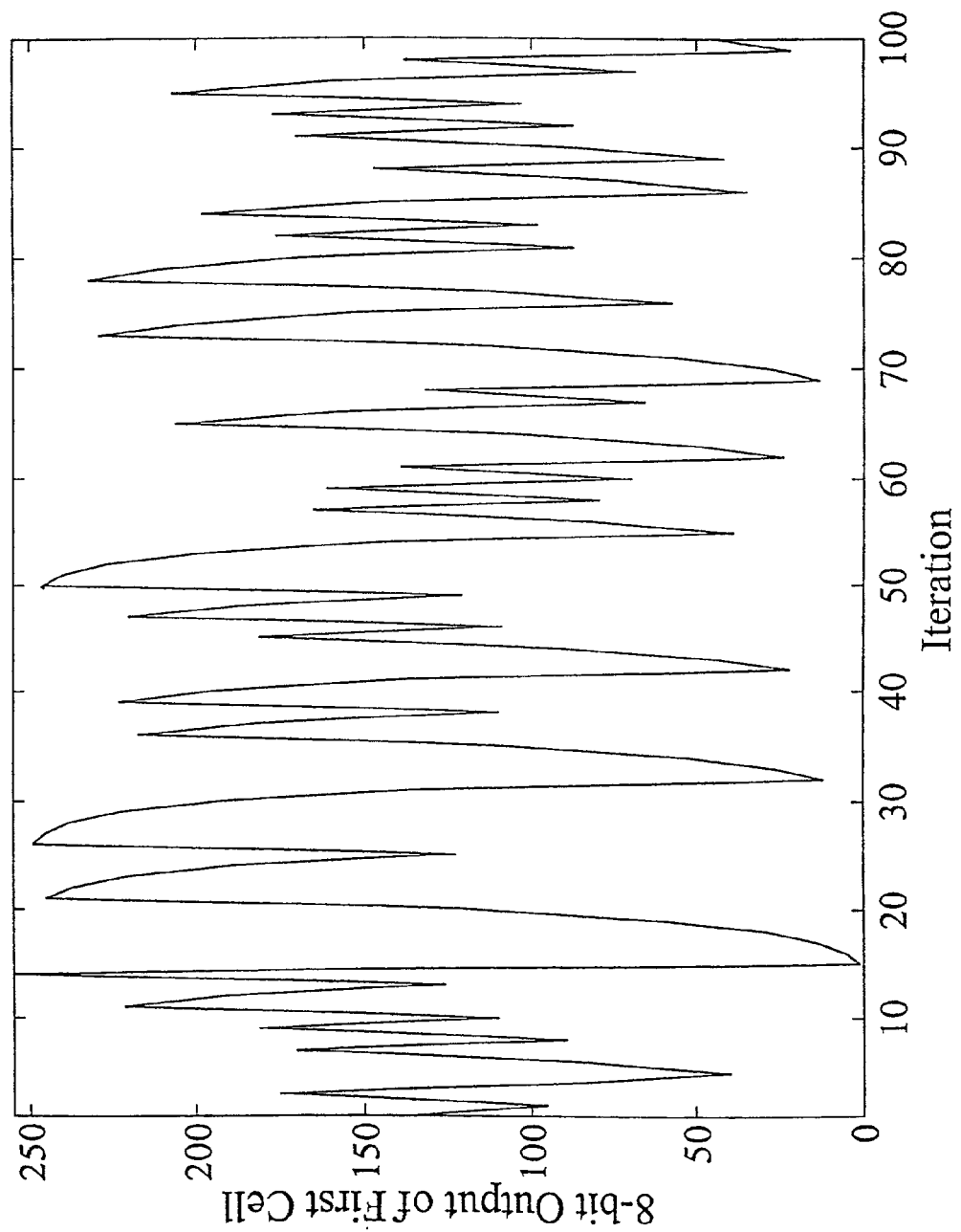
FIGS. 10a and 10b display the first 100 iterations of one of the several trajectory pairs generated by the hierarchial cascade architecture shown in FIG. 9.
Figure 10B:
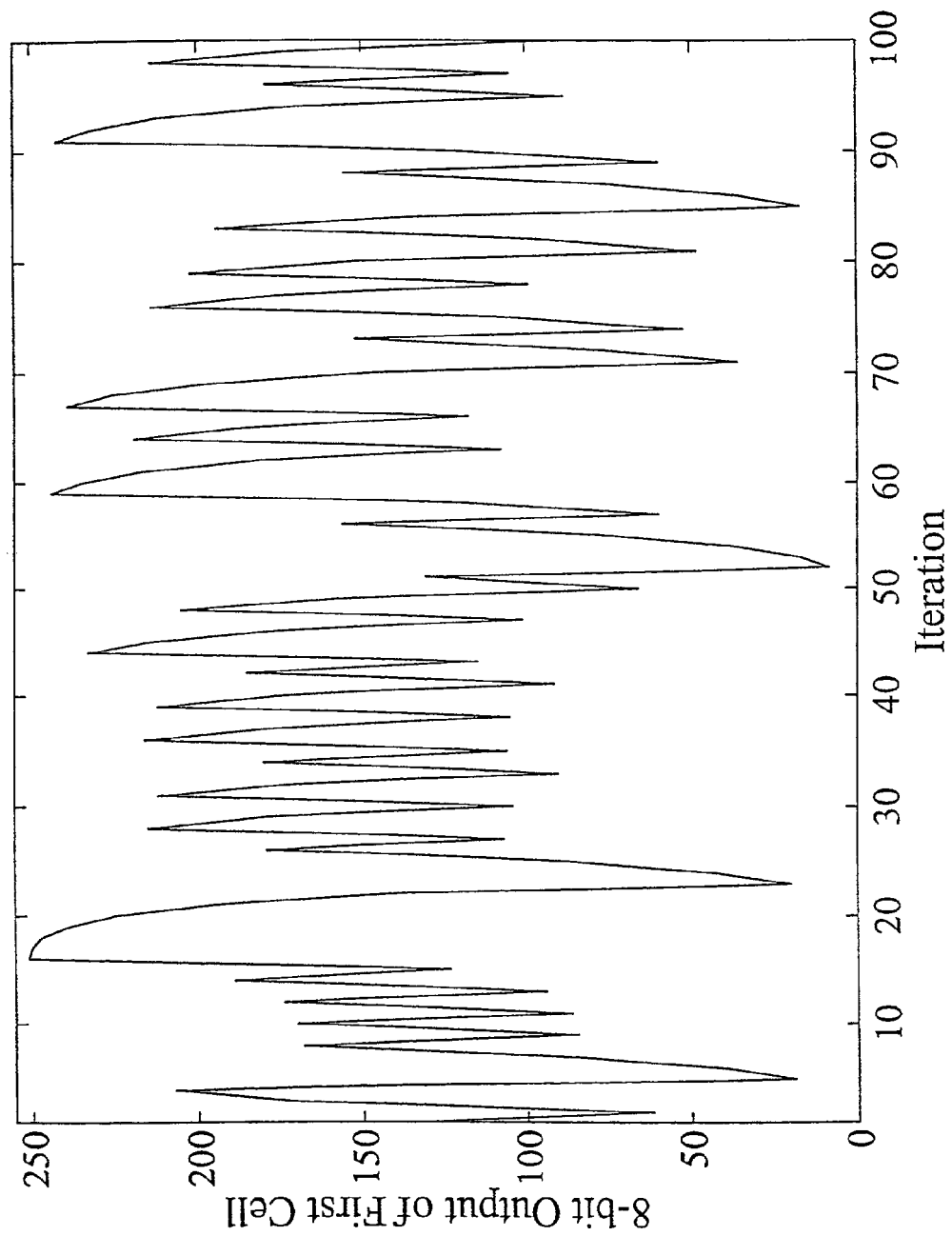
Figure 11A:
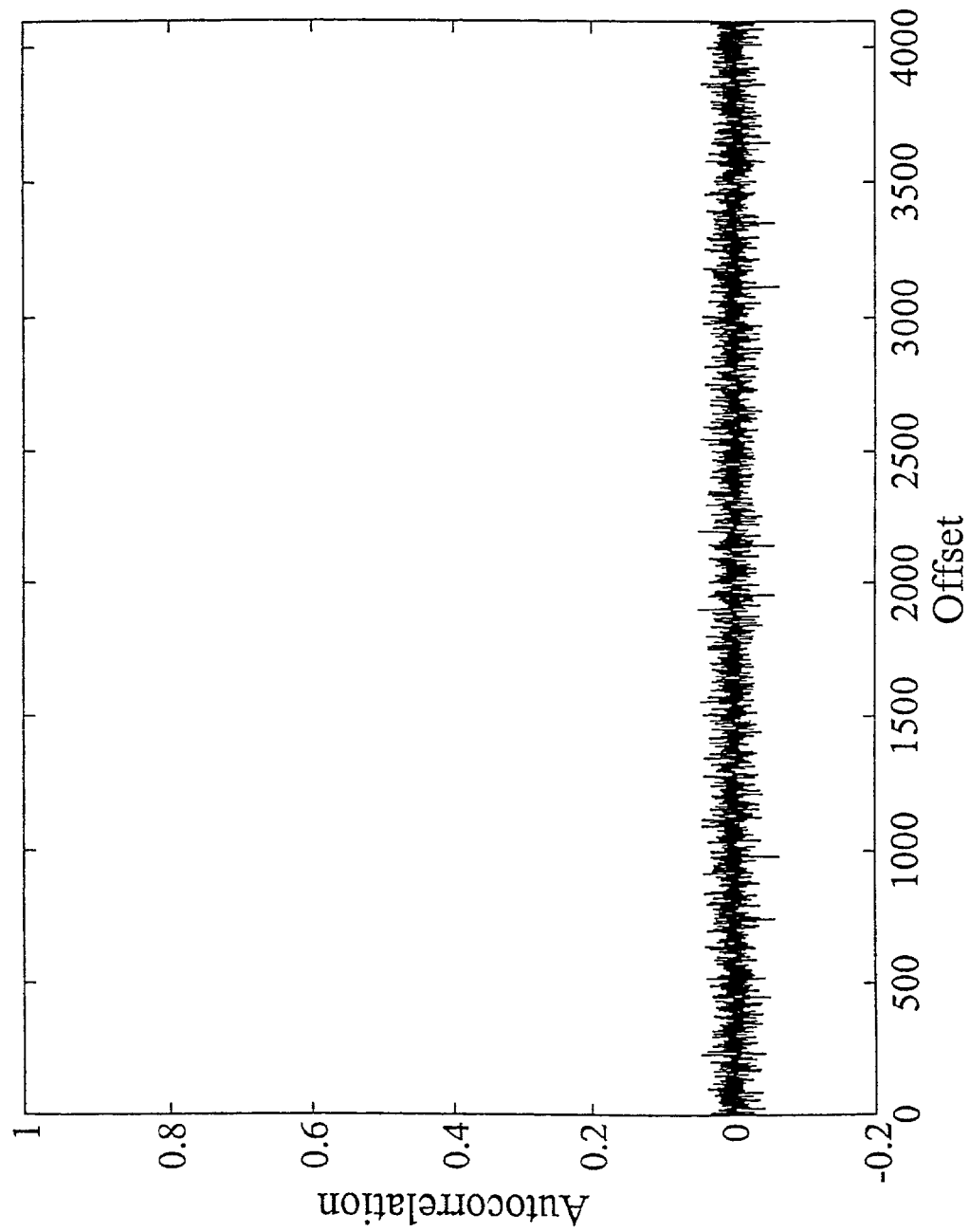
FIGS. 11a and 11b display 4,096 point truncated auto and cross-correlation plots of sample sequences obtained from the architecture with a chaotically varied number of cells.
Figure 11B:
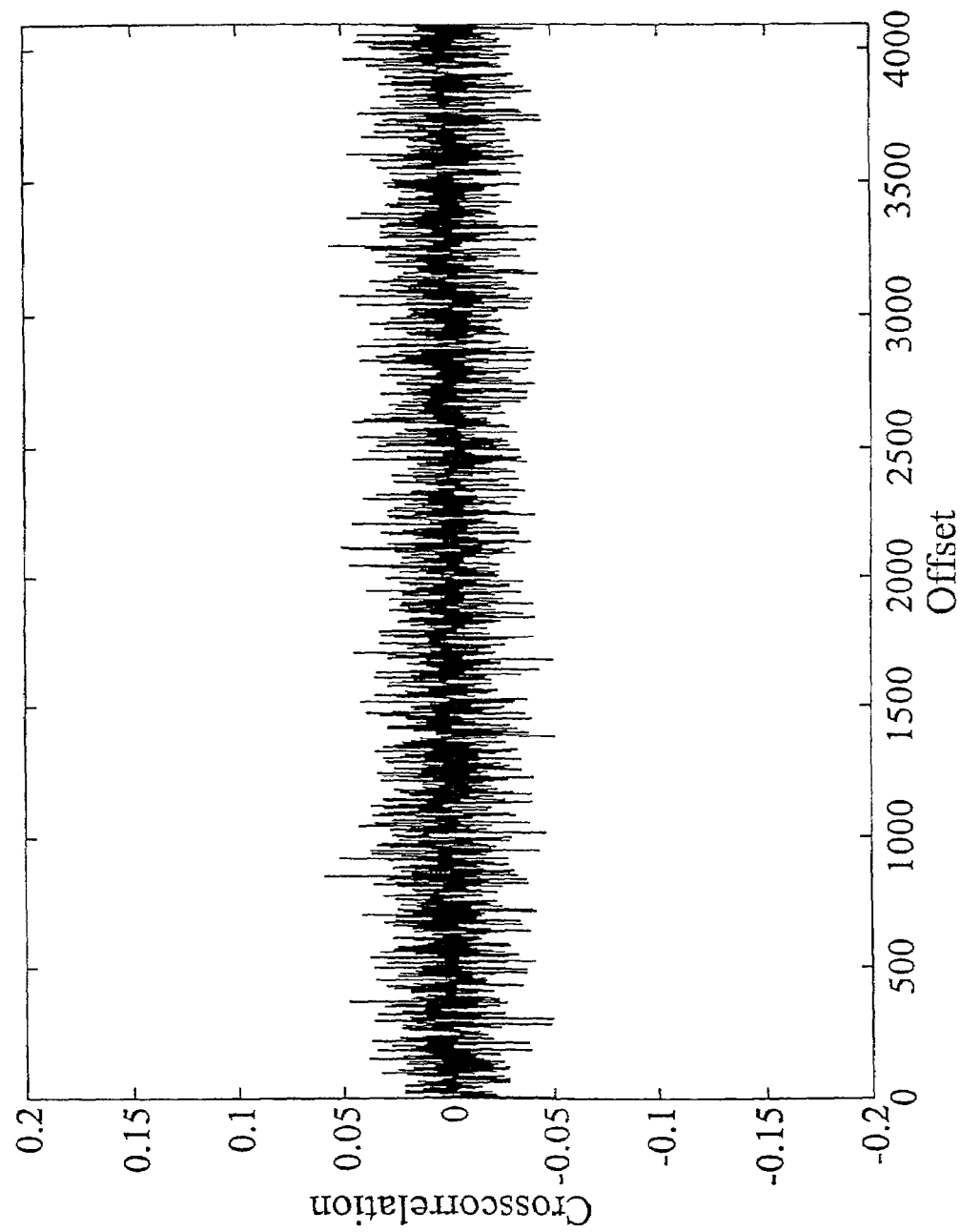

The operation of said architectures has been modeled at the logic gate level and the output (PN) sequences have been exhaustively tested using both the initial condition sensitivity and correlation analysis. FIGS. 10a and 10b, for instances display the first 100 iterations of one of the several trajectory pairs generated by the hierarchial cascade architecture shown in FIG. 9 with one bit initial condition differences in the LSB position. The trajectories have also been observed to remain divergent for 4,000,000 iterations, demonstrating the sensitive dependence on initial conditions. Also, this architecture has been simulated for more than 5000 different initial condition loading cycles. The (PN) sequences generated thereby have been exhaustively tested with respect to their statistical properties, yielding results similar to that of the four cell stage. In addition, FIGS. 11a and 11b display 4,096 point truncated out and cross-correlation plots of sample sequences obtained from the architecture with a chaotically varied number of cells. The results show that the sequences generated this way have the same chaotic and statistical properties as the four cell architectures.

Figure 12:
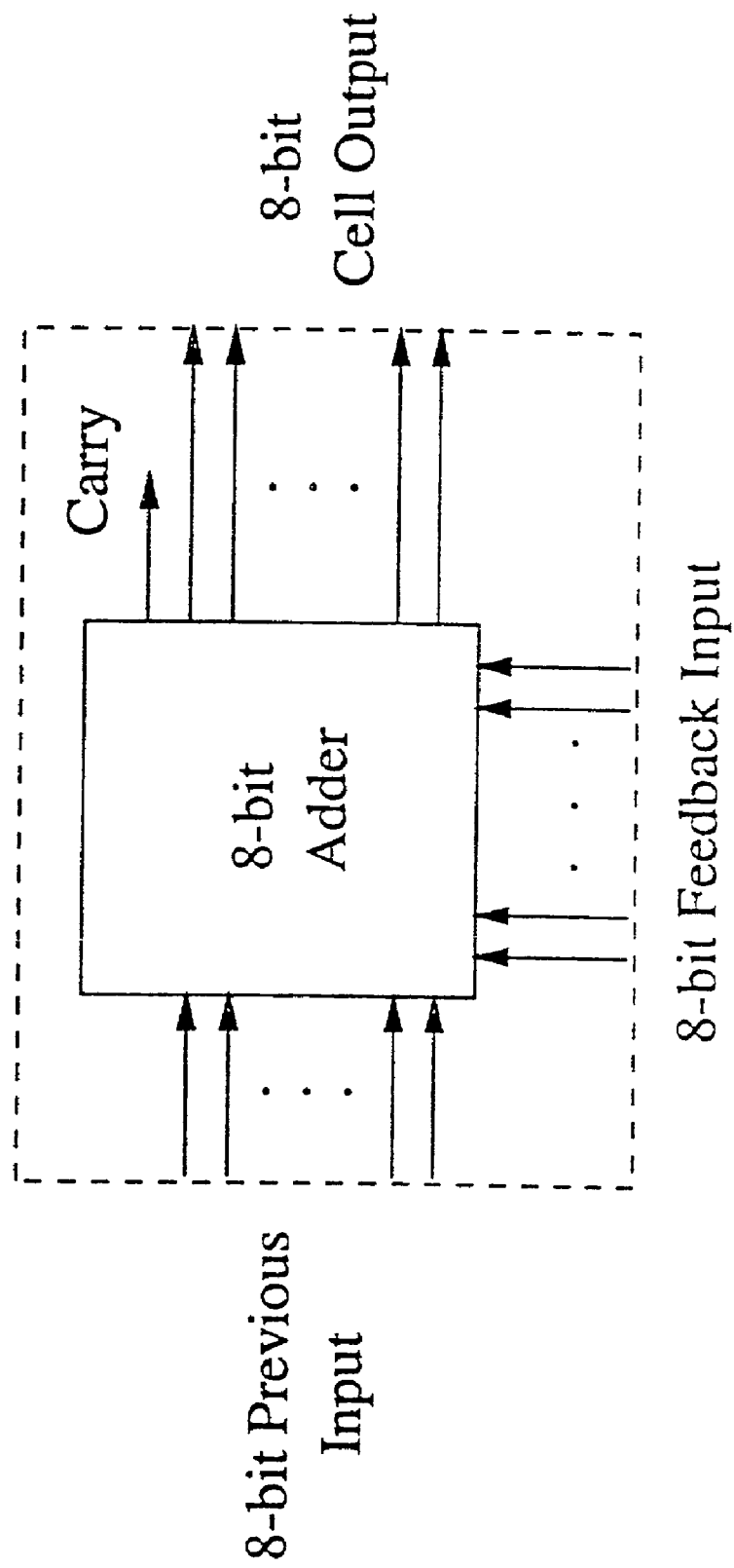
FIG. 12 shows that the circuit for the chaotic cell can be reduced to a binary full-adder with an ignored carry output bit.

To assess hardware performance of a direct digital realization the four stage architecture of FIG. 4 was implemented as an actual circuit. Substantial reductions in the hardware complexity can be achieved by noting the ½ scaling factor is canceled by the 2× operation of the directly quantized map shown in FIG. 3a. A further circuit simplification is possible by realizing that the modulus 256 operation can be performed by taking the eight Least Significant Bits (LSB) of the map output. Hence, by exploiting these hardware simplifications, the circuit for the chaotic cell can be reduced to a binary full-adder with an ignored carry output bit, as depicted in FIG. 12.

The overall structure has been included within a test chip that has been fabricated with 1.5 micron CMOS technology. In this test circuit, cells 1, 2 and 3 are identical whereas cell 4 is only composed of a shift register, since an adder is not required. In addition to the chaotic cells, the test chip also houses logic for serial initial condition programming and control circuitry for telescopically configuring the number of cascaded cells either as three or four. The total number of transistors used for this design is approximately 2000, and the core of the test chip die occupies an area of about 1750 microns square.

Figure 13A:
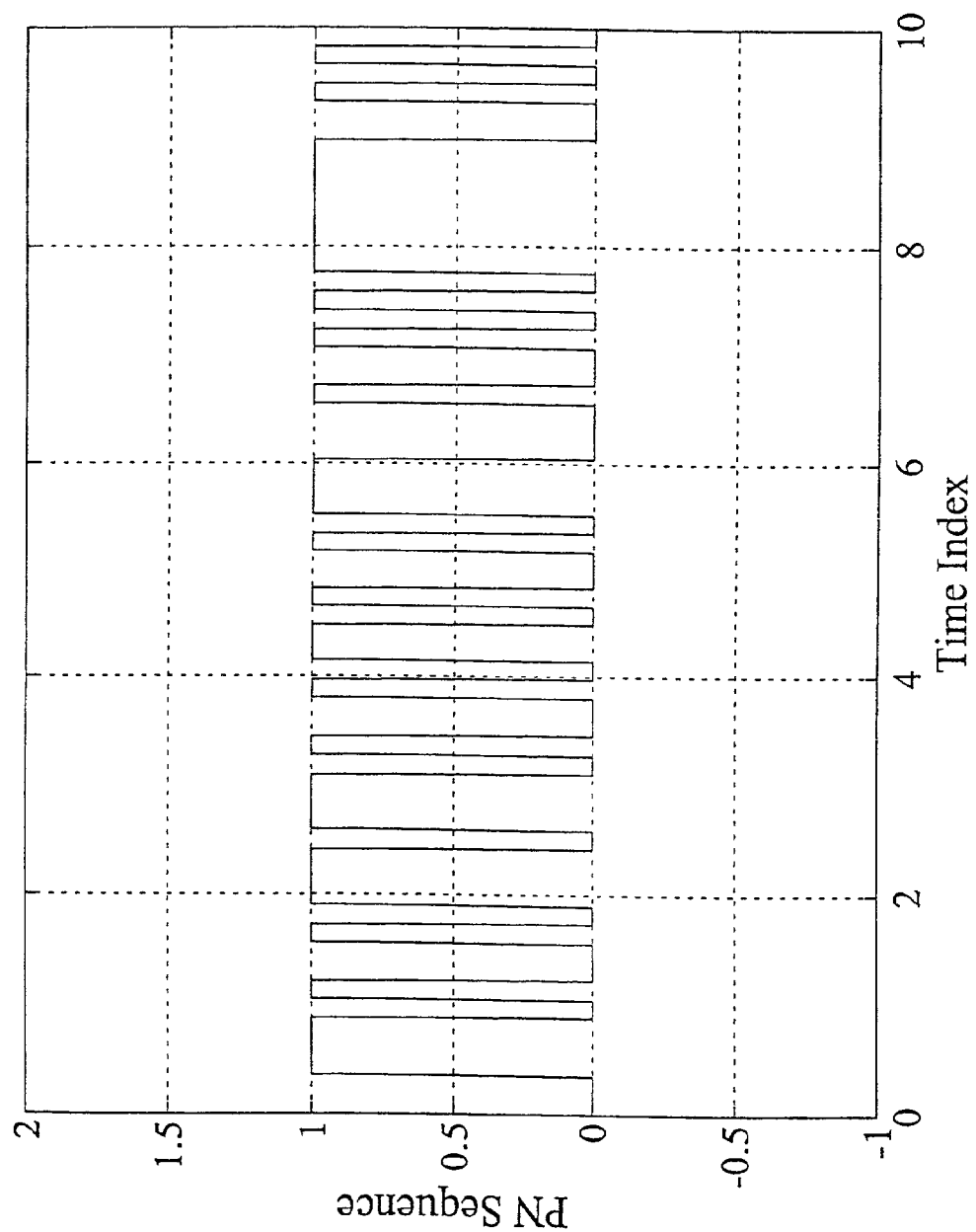
FIGS. 13a and 13b show the robustness of the present invention (PN) sequence generator and that computer simulation and circuit output results are in perfect agreement.
Figure 13B:
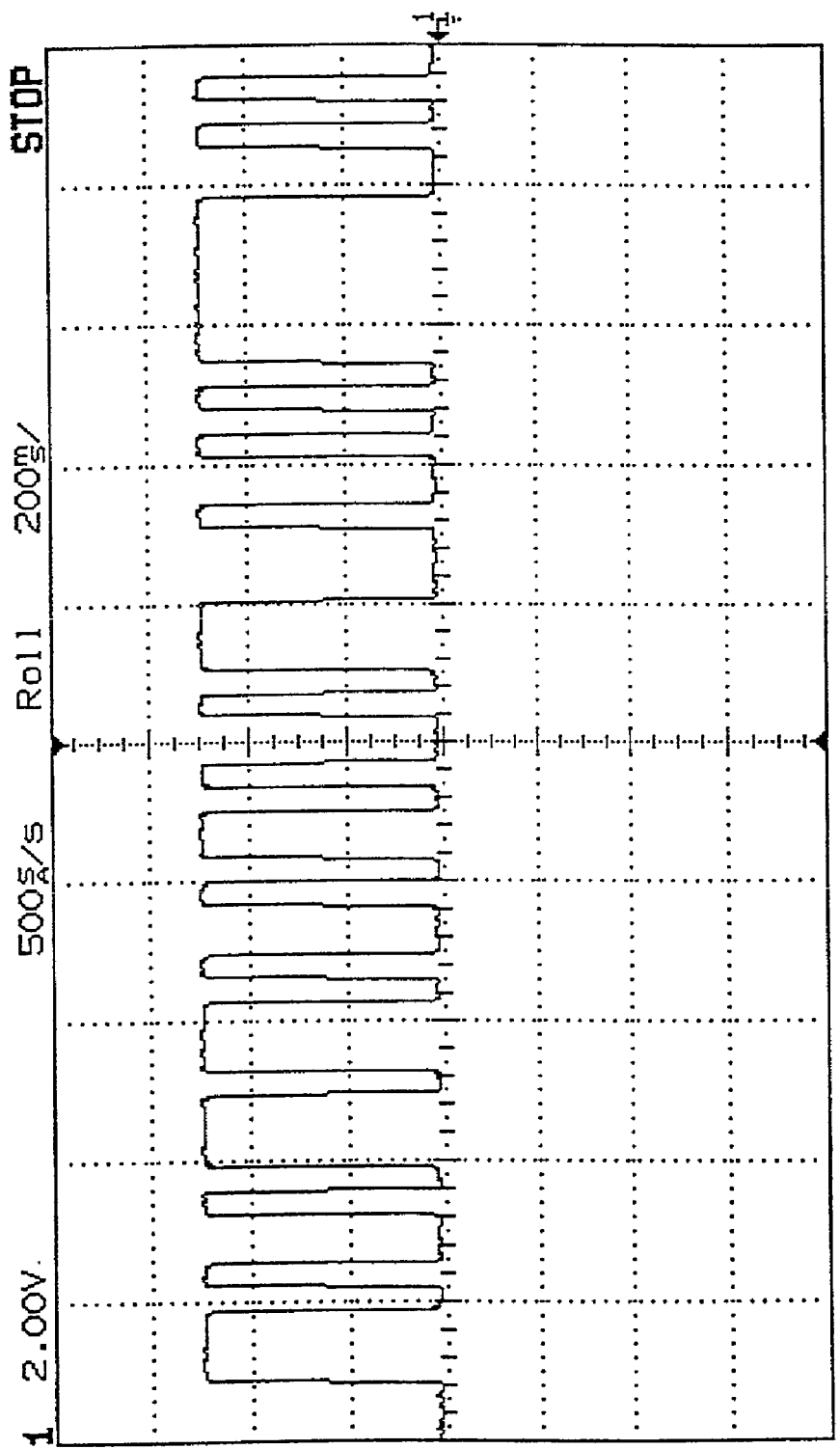

The prototype test chip has been successfully tested, and the result justified the present invention design approach. Functional test results have shown that the direct quantization approach and the resulting hardware reduction yield accurate and reliable chaotic (PN) sequence generation. The robustness of the present invention (PN) sequence generator is demonstrated by FIGS. 13a and 13b. It is clear from said FIGS. 13a and 13b that the computer simulation and circuit output results are in agreement, with the only difference being that only slight pulse shape differences are noticeable. Since the underlying implementation is digital, the agreement between the simulated system and the actual system is easily obtained. This is not necessarily the case with analog chaotic architecture implementations. Moreover, the prototype chip has been tested to operate reliably with clock rate in excess of 30 MHz. This suggests that the (PN) sequence generator architecture will easily achieve higher switching rates if the design is scaled for a sub-micron CMOS technology.

As identified in the Background Section, previous researchers have observed that the statistical properties of chaotic sequences are similar to those of conventional (PN) sequences. Thus, chaotic sequences may be useful in applications that utilize traditional (PN) sequences. In that light it is useful to compare the statistical properties of the sequences generated by the architecture described earlier herein, with those of conventional (PN) sequences. The utility of the chaotic sequences is then explored through an application to an asynchronous (DS-CDMA) system in the presence of Channel Interference (CI). In order to compare the statistical properties of chaotic sequences generated by present invention systems to conventional (PN) sequences, partial period auto-correlation and cross-correlation were computed. Partial periods of length 128 bits, 1024 bits and 32768 bits were used for both the auto and cross-correlation computations. Gold sequences and n-sequences were chosen as representative conventional (PN) sequences since they are widely known in DS-CDMA communication systems, including under IS-95. The chaotic generator shown in FIG. 4 has a 32 bit initial condition register, so 32 bit Gold and m-sequences were used for comparison. The results are shown in Table 1.

TABLE I

|  | Chaotic sequence | m-sequence | Gold sequence |
|---|---|---|---|
| Autocorrelation |  |  |  |
| 128-bit | 0.312 | 0.281 | 0.390 |
| 1024-bit | 0.128 | 0.121 | 0.138 |
| 32768-bit | 0.026 | 0.026 | 0.027 |
| Crosscorrelation |  |  |  |
| 128-bit | 0.297 | 0.328 | 0.351 |
| 1024-bit | 0.128 | 0.136 | 0.159 |
| 32768-bit | 0.027 | 0.031 | 0.027 |

It is known that the performance of a (DS-CDMA) system is highly dependent on the pair-wise cross-correlation properties of the set of sequences. For chaotic sequences, determining these properties is complicated by the fact that memory of the generator is not well defined and trajectories are of varying lengths. The results shown in Table 1 for the chaotic sequences are observed upper bounds for 5000 sequences that have comparable values of auto-correlation and generally lower values of cross-correlation. This clearly suggests that the sequences may find application as spreading sequences in a multi-user (DS-CDMA) system.

Figure 14:
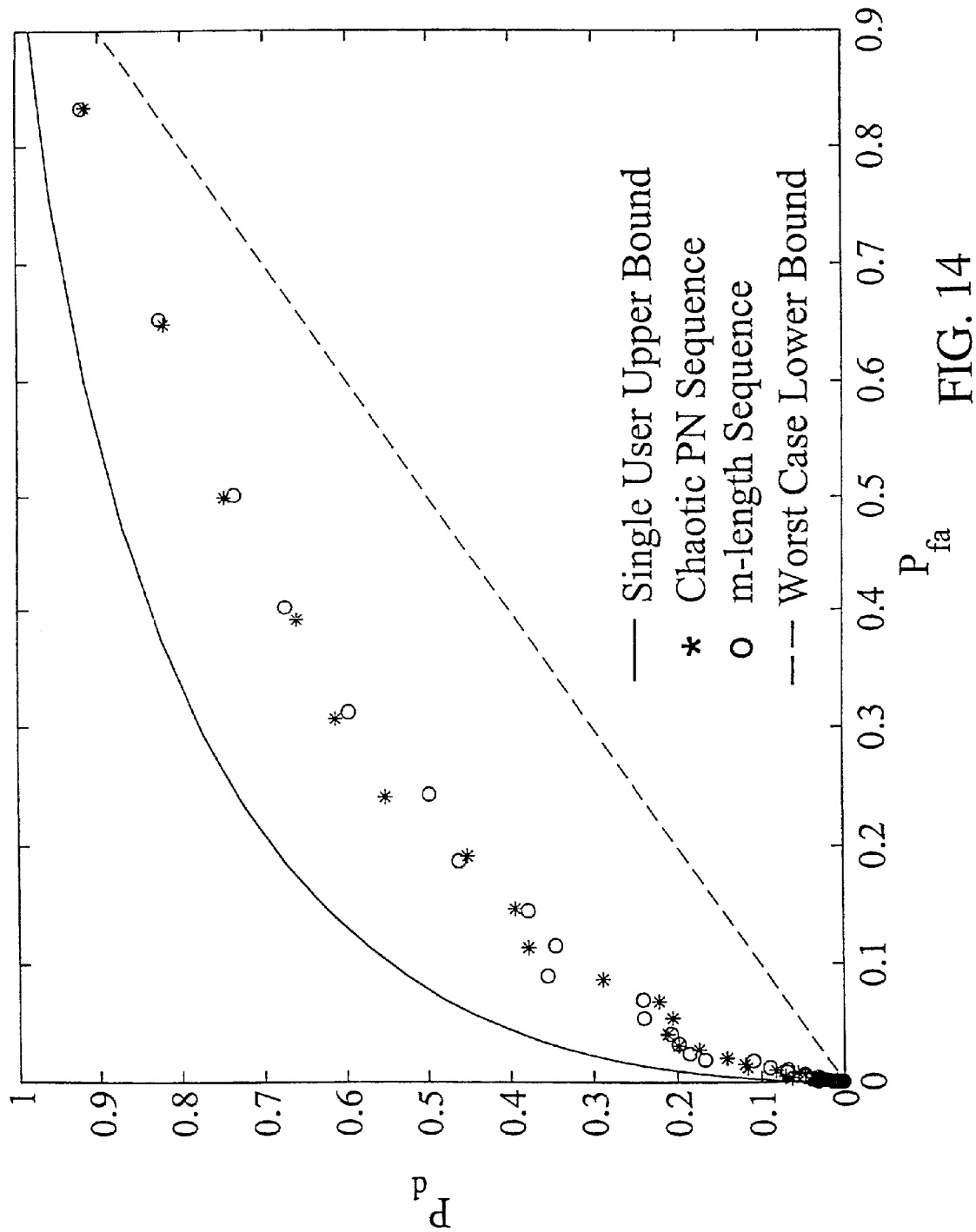
FIG. 14 shows simulated results for acquisition performance (Pd) vs. probability of false alarm (Pfa) for chaotic sequences with 32 bit initial conditions and 32 bit m-sequences, respectively, for the case of 30 interfering users in a (DS-CDMA) environment.

To explore the potential of chaotic sequences, the sequence acquisition performance was simulated for an asynchronous multi-user (DS-CDMA) system with additive which Gaussian Noise (AWGN) and with Channel Interference (CI). As in IS-95, a transmitter with quadrature phase shift-keying (QPSK) spreading was assumed. The sequence acquisition performance (Pd) in the presence of (CI) may be parameterized by the probability of false alarm (Pfa). The probability of false alarm (Pfa) is the probability that the sequence acquisition mechanism incorrectly synchronizes on the spreading sequence. Simulation results for (Pd) vs. (Pfa), for chaotic sequences with 32 bit initial conditions and 32 bit m-sequences, are shown in FIG. 14 for the case of 30 interfering users. Also shown in FIG. 14 are the single user upper bound and a worst case lower bound. In this work each interfering user was considered as a white noise source with variance given as 1/Sp in determining the worst case lower bound, where "Sp" is the spreading factor, (chosen as 64 in the presently reported work). The results in FIG. 14 show that the performance of the chaotic sequences is very similar to that of the m-sequences and is consistent with the statistical properties given in Table 1.

It should be appreciated that the large set of system parameters, (eg. initial conditions and internal configuration of digital chaotic map cells etc.), in combination with the non-linear nature of directly quantized chaotic map cell, binary quantized output/input functions, makes present invention (PN) sequence generation systems applicable to programmably secure applications to communications systems. Present invention (PN) sequence generation systems can be realized by hardware comprising on the order of 2000 transistors in a 32 bit programmable system. Further, present invention (PN) sequence generation systems derive statistical characteristic properties from specific architecture and integrated circuits used to implement them. This means that the number of implementations possible is very large, and in combination with software control, (PN) sequences which are very long and difficult to detect are realizable.

It is also to be understood that the terminology "mapping function which is a directly quantized version of an analog output/input single ramp map", includes a quantized ramp which has a generally positive or generally negative slope between a cycle minimum magnitude start point and maximum magnitude end point, and which is stepwise continuous between said cycle start and end points, and can include a singel ramp which is phase shifted so that the minimum magnitude point is positioned between the cycle start and end points.

It should be understood that digital chaotic map cells which perform a directly quantized output/input mapping function, can be realized by hardware, hardware in combination with software, and/or by software driven look-up tables etc.

It is also emphasized that while the Figures show single and double cycle containing digital chaotic map cells which perform a directly quantized output/input mapping function, such is demonstrative and not limiting. Specifically it is to be understood that a directly quantized output/input map can comprise any number of cycles, and the claims are to be interpreted as such.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

We claim:

1. A psuedo-noise (PN) sequence generator comprising N stages, each of said N stages comprising a digital chaotic map cell having input means and output means, which digital chaotic map cell performs a directly quantized output/input mapping function such that a quantized binary input thereto results in a quantized binary output therefrom.

2. A psuedo-noise (PN) sequence generator as in claim 1, in which the output/input mapping function is a directly quantized version of an analog output/input map selected from the group consisting of:
   tent;
   single ramp and
   multiple ramp.

3. A psuedo-noise (PN) sequence generator as in claim 1, in which the Nth stage comprises:
   said a digital chaotic map cell having input means and output means, which digital chaotic map cell performs a directly quantized output/input mapping function;
   a combiner means comprising at least a first input means, and an output means;
   an m-bit shift register having input means and at least one selection from the group consisting of:
      parallel output means; and
      series output means;
   said psuedo-noise (PN) sequence generator further comprising a quantizer having input and output means;
   said output means of said quantizer being directly for N=1, or indirectly through at least a first m-bit shift register for N>1, functionally connected to the input means of said Nth stage m-bit shift register, and
   a selection from the group consisting of:
      said parallel output means; and
      said series output means;
   of said Nth stage m-bit shift register being functionally connected to said first input means of said Nth stage combiner means; and
   a selection from the group consisting of:
      said series output means; and
      said parallel output means; and
      neither said series or parallel output means;
   of said Nth stage m-bit shift register being functionally connected a second input means of said Nth stage combiner means;
   said output means of said Nth stage combiner means being functionally connected to said input means of said Nth stage digital chaotic map cell, and
   said output means of said Nth stage digital chaotic map cell being directly for N=1, or indirectly through at least a first stage digital chaotic map cell for N>1, functionally connected to said input means of said quantizer;
   such that in use:
   a. said Nth stage m-bit shift register is loaded with an initial m-bits; and
   b. said Nth stage m-bit shift register parallel output and/or series output provides input to the Nth stage combiner means;

such that:
   c. said Nth stage combiner means, in response to input(s) from the Nth stage m-bit shift register, provides an output which is input to said input means of said Nth stage digital chaotic map cell, which Nth stage digital chaotic map cell outputs at least one bit which causes a bit to be input to the quantizer input means, such that said quantizer, in response, produces a string of at least a one output bit(s), one bit of said string of at least one output bit(s) being a first psuedo-noise sequence output bit, and
one bit of said string of at least one output bit(s) causes input of a bit to the input means of the said Nth stage m-bit shift register, thereby sequentially causing bit shifting therein so that new input is provided to the Nth stage digital chaotic map cell, to the end that a new input bit is caused to enter said input means of said quantizer;
the result being that the quantizer output means outputs a psuedo-noise sequence of at least one bit(s).

4. An N stage psuedo-noise (PN) sequence generator system as in claim 3, in which the Nth combiner means functionally connects an output from the Nth m-bit shift register to the input of the Nth digital chaotic map cell.

5. A one stage psuedo-noise (PN) sequence generator system comprising:
   a digital chaotic map cell having input means and output means, which digital chaotic map cell performs a directly quantized output/input mapping function;
   a combiner means comprising at least first input means, and an output means;
   an m-bit shift register having input means and at least one selection from the group consisting of:
      parallel output means; and
      series output means; and
   a quantizer having input and output means;
said output means of said quantizer being functionally connected to the input means of said m-bit shift register, and
a selection from said group consisting of:
   said parallel output means; and
   said series output means;
of said m-bit shift register being functionally connected to the first input means of said combiner means; and
a selection from said group consisting of:
   said series output means; and
   said parallel output means; and
   neither said series or parallel output means:
of said m-bit shift register being functionally connected to the second input means of said combiner means;
said output means of said combiner means being functionally connected to said input means of said digital chaotic map cell, and
said output means of said digital chaotic map cell being functionally connected to said input means of said quantizer;
such that in use:
   a. said m-bit shift register is loaded with an initial m-bits; and
   b. said m-bit shift register parallel output and/or series output provide input to the combiner means;
such that:
   c. said combiner means provides an output which is input to said input means of said digital chaotic map cell, which digital chaotic map cell outputs at least one bit which is input to the quantizer input means, such that said quantizer, in response, produces a string of at least a one output bit(s), one bit of said string of at least one output bit(s) being a first psuedo-noise sequence output bit, and
one bit of said string of at least one output bit(s) is input to the input means of the said m-bit shift register, thereby sequentially causing bit shifting therein so that new input is provided to the digital chaotic map cell, to the end that a new input bit is caused to enter said input means of said quantizer;
such that the quantizer output means outputs a psuedo-noise sequence of at least one bit(s).

6. A one stage psuedo-noise (PN) sequence generator system as in claim 5, wherein in use step c. is repeated at least twice.

7. A N one stage psuedo-noise (PN) sequence generator system as in claim 5, in which at least one combiner means comprises:
   summation-and-divide-by-two means;
   m-bit shift register accessed by said second input thereto;
   means for accepting m-bits from said first input thereto;
such that in use said summation-and-divide-by-two means is provided binary inputs from both said:
   m-bit shift register accessed by said second input thereto;
   means for accepting m-bits from said first input thereto;
and provides an m-bit binary half-sum thereof at its output.

8. A one stage psuedo-noise (PN) sequence generator system as in claim 5, in which the combiner means comprises means for accepting m-bits from a selection from the group consisting of:
   said parallel output; and
   said series output;
of said m-bit shift register.

9. A one stage psuedo-noise (PN) sequence generator system as in claim 5, in which the combiner means functionally connects an output from the m-bit shift register to the input of the digital chaotic map cell.

10. A two stage psuedo-noise (PN) sequence generator system comprising:
   first and second digital chaotic map cells each having input means and output means, which digital chaotic map cells each perform directly quantized output/input mapping functions;
   first and second combiner means which each comprise at least first input means, and an output means;
   first and second m-bit shift registers, each having input means and at least one selection from the group consisting of:
      parallel output means; and
      series output means; and
   a quantizer having input and output means;
said output means of said quantizer being functionally connected to the input means of said first m-bit shift register, and
said parallel output means of said first m-bit shift register being functionally connected to the first input means of said first combiner means;
said series output means of said first m-bit shift register being functionally connected to the input means of said second m-bit shift register;
said output means of said first combiner means being functionally connected to said input means of said first digital chaotic map cell, and
said output means of said first digital chaotic map cell being functionally connected to said input means of said quantizer;
a selection from the group consisting of:
   parallel output means; and
   series output means;

of said second m-bit shift register being functionally connected to a selection from the group consisting of:
  first input means; and
  second input means;
of said second combiner means;
said output means of said second combiner means being functionally connected to said input means of said second digital chaotic map cell, and
said output means of said second digital chaotic map cell being functionally connected to said second input means of said first combiner means;
such that in use:
  a. said first and second m-bit shift registers are loaded with an initial m-bits; and
  b. said first m-bit shift register parallel output provides, input to the first combiner means first input means, and said second m-bit shift register provides input to said second combiner means;
such that:
  c. said first and second combiner means, in response to input(s) thereto, each provide an output which is input to said input means of said first and second digital chaotic map cell, respectively, which first digital chaotic map cell outputs at least one bit which is input to the quantizer input means, such that said quantizer, in response, produces a string of at least a one output bit(s), one bit of said string of at least one output bit(s) being a first psuedo-noise sequence output bit, and
one bit of said string of at least one output bit(s) is input to the input means of the said first m-bit shift register, thereby sequentially causing bit shifting in said first and second m-bit shift registers so that each of the N combiner means, respectively, provides new input to each of the N digital chaotic map cells, to the end that a new input bit is caused to enter said input means of said quantizer;
such that the quantizer output means outputs a psuedo-noise sequence of at least one bit(s).

11. A two stage psuedo-noise (PN) sequence generator system as in claim 10, wherein in use step c. is repeated at least twice.

12. A two stage psuedo-noise (PN) sequence generator system as in claim 10, in which the at least one of the first and second combiner means comprises:
  summation-and-divide-by-two means;
  m-bit shift register accessed by said second input thereto;
  means for accepting m-bits from said first input thereto;
such that in use each said summation-and-divide-by-two means is provided binary inputs from both said:
  m-bit shift register accessed by said second input thereto;
  means for accepting m-bits from said first input thereto;
and provides an m-bit binary half-sum thereof at its output.

13. A two stage psuedo-noise (PN) sequence generator system as in claim 10, in which the second combiner means functionally connects an output from the 2nd m-bit shift register to the input of the 2nd digital chaotic map cell.

14. A three stage psuedo-noise (PN) sequence generator system comprising:
  first, second and third digital chaotic map cells each having input means and output means, which digital chaotic map cells each perform directly quantized output/input mapping functions;
  first, second and third combiner means which each comprise at least first means, and an output means;
  first, second and third m-bit shift registers, each having input means and at least one selection from the group consisting of:
    parallel output means; and
    series output means; and
  a quantizer having input and output means;
said output means of said quantizer being functionally connected to the input means of said first m-bit shift register, and
said parallel output means of said first m-bit shift register being functionally connected to the first input means of said first combiner means;
said series output means of said first m-bit shift register being functionally connected to the input means of said second m-bit shift register;
said output means of said first combiner means being functionally connected to said input means of said first digital chaotic map cell, and
said output means of said first digital chaotic map cell being functionally connected to said input means of said quantizer;
said parallel output means of said second m-bit shift register being functionally connected to the first input means of said second combiner means;
said series output means of said second m-bit shift register being functionally connected to the input means of said third m-bit shift register;
said output means of said second combiner means being functionally connected to said input means of said second digital chaotic map cell, and
said output means of said second digital chaotic map cell being functionally connected to said second input means of said first combiner means;
a selection from the group consisting of:
  parallel output means; and
  series output means;
of said third m-bit shift register being functionally connected to a selection from the group consisting of:
  first input means; and
  second input means;
of said third combiner means;
said output means of said third combiner means being functionally connected to said input means of said third digital chaotic map cell, and
said output means of said third digital chaotic map cell being functionally connected to said second input means of said second combiner means;
such that in use:
  a. said first, second and third m-bit shift registers are loaded with an initial m-bits; and
  b. said first and second m-bit shift register parallel outputs provide, respectively, input to the first and second combiner means first input means, and said third m-bit shift register provides input to said third combiner means;
such that:
  c. said first, second and third combiner means, in response to inputs thereto, each provide an output which is input to said input means of said first, second and third digital chaotic map cell, respectively, which first digital chaotic map cell outputs at least one bit which is input to the quantizer input means, such that said quantizer, in response, produces a string of at least a one output bit(s), one bit of said string of at least one output bit(s) being a first psuedo-noise sequence output bit, and
one bit of said string of at least one output bit(s) is input to the input means of the said first m-bit shift register, thereby sequentially causing bit shifting in said first, second and third m-bit shift registers so that each of the N combiner means, respectively, provides new input to each of the N digital chaotic map cells, to the end that a new input bit is caused to enter said input means of said quantizer;

such that the quantizer output means outputs a psuedo-noise sequence of at least one bit(s).

15. A three stage psuedo-noise (PN) sequence generator system as in claim 14, wherein in use step c. is repeated at least twice.

16. A three stage psuedo-noise (PN) sequence generator system as in claim 14, in which the at least one of the first, second and third combiner means comprises:
   summation-and-divide-by-two means;
   m-bit shift register accessed by said second input thereto;
   means for accepting m-bits from said first input thereto;
such that in use each said summation-and-divide-by-two means is provided binary inputs from both said:
   m-bit shift register accessed by said second input thereto;
   means for accepting m-bits from said first input thereto;
and provides an m-bit binary half-sum thereof at its output.

17. A three stage psuedo-noise (PN) sequence generator system as in claim 14, in which the third combiner means functionally connects an output from the 3rd m-bit shift register to the input of the 3rd digital chaotic map cell.

18. A four stage psuedo-noise (PN) sequence generator system comprising:
   first, second, third and fourth digital chaotic map cells each having input means and output means, which digital chaotic map cells each perform directly quantized output/input mapping functions;
   first, second, third and fourth combiner means which each comprise at least first input means, and output means;
   first, second, third and fourth m-bit shift registers, each having input means and at least one selection from the group consisting of:
      parallel output means; and
      series output means; and
   a quantizer having input and output means;
said output means of said quantizer being functionally connected to the input means of said first m-bit shift register, and
said parallel output means of said first m-bit shift register being functionally connected to the first input means of said first combiner means;
said series output means of said first m-bit shift register being functionally connected to the input means of said second m-bit shift register;
said output means of said first combiner means being functionally connected to said input means of said first digital chaotic map cell, and
said output means of said first digital chaotic map cell being functionally connected to said input means of said quantizer;
said parallel output means of said second m-bit shift register being functionally connected to the first input means of said second combiner means;
said series output means of said second m-bit shift register being functionally connected to the input means of said third m-bit shift register;
said output means of said second combiner means being functionally connected to said input means of said second digital chaotic map cell, and
said output means of said second digital chaotic map cell being functionally connected to said second input means of said first combiner means;
said parallel output means of said third m-bit shift register being functionally connected to the first input means of said third combiner means;

said series output means of said third m-bit shift register being functionally connected to the input means of said fourth m-bit shift register;
said output means of said third combiner means being functionally connected to said input means of said third digital chaotic map cell, and
said output means of said third digital chaotic map cell being functionally connected to said second input means of said second combiner means;
a selection from the group consisting of:
   parallel output means; and
   series output means;
of said third m-bit shift register being functionally connected to a selection from the group consisting of:
   first input means; and
   second input means;
of said third combiner means;
said output means of said fourth combiner means being functionally connected to said input means of said fourth digital chaotic map cell, and
said output means of said fourth digital chaotic map cell being functionally connected to said second input means of said third combiner means;
such that in use:
   a. said first, second, third and fourth m-bit shift registers are loaded with an initial m-bits; and
   b. said first, second and third m-bit shift register parallel outputs provide inputs to the first, second and third combiner means first input means, and said fourth m-bit shift register provides input to the fourth combiner means;
such that:
   c. said first, second, third and fourth combiner means, in response to inputs thereto, each provide an output which is input to said input means of said first, second, third and fourth digital chaotic map cell, respectively, which first digital chaotic map cell outputs at least one bit which is input to the quantizer input means, such that said quantizer, in response, produces a string of at least a one output bit(s), one bit of said string of at least one output bit(s) being a first psuedo-noise sequence output bit, and one bit of said string of at least one output bit(s) is input to the input means of the said first m-bit shift register, thereby sequentially causing bit shifting in said first, second, third and fourth m-bit shift registers so that each of the N combiner means, respectively, provides new input to each of the N digital chaotic map cells, to the end that a new input bit is caused to enter said input means of said quantizer;

such that the quantizer output means outputs a psuedo-noise sequence of at least one bit(s).

19. A four stage psuedo-noise (PN) sequence generator system as in claim 18, wherein step c. is repeated at least twice.

20. A four stage psuedo-noise (PN) sequence generator system as in claim 18, in which at least one of the first, second, third and fourth combiner means comprises:
   summation-and-divide-by-two means;
   m-bit shift register accessed by said second input thereto;
   means for accepting m-bits from said first input thereto;
such that in use each said summation-and-divide-by-two means is provided binary inputs from both said:
   m-bit shift register accessed by said second input thereto;
   means for accepting m-bits from said first input thereto;
and provides an m-bit binary half-sum thereof at its output.

21. A four stage psuedo-noise (PN) sequence generator system as in claim 18, in which the fourth combiner means functionally connects an output from the 4th m-bit shift register to the input of the 4th digital chaotic map cell.

22. An N stage psuedo-noise (PN) sequence generator system comprising:
N digital chaotic map cells each having input means and output means, which digital chaotic map cells each perform directly quantized output/input mapping functions;
N combiner means which each comprise at least first input means, and an output means;
N m-bit shift registers, each having input means and at least one selection from the group consisting of:
parallel output means; and
series output means; and
a quantizer having input and output means;
said output means of said quantizer being functionally connected to the input means of said first m-bit shift register, and
said parallel output means of each of the first to the N–1th m-bit shift register being functionally connected to the first input means of the corresponding combiner means;
the series output means of said 1st m-bit shift register being functionally connected to the input means of the (N–(N–2)) m-bit shift register; and
the series output means of said (N–(N–2)) m-bit shift register being functionally connected to the input means of the (N–(N–3)) m-bit shift register;
with said interconnection progression continuing to the point that the series output means of the (N–1)th m-bit shift register is functionally interconnected to the input of the Nth m-bit shift register;
a selection from the group consisting of:
parallel output means; and
series output means;
of said Nth m-bit shift register being functionally connected to a selection from the group consisting of:
first input means; and
second input means;
of said Nth combiner means;
said output means of said Nth combiner means being functionally connected to said input means of said Nth digital chaotic map cell, and
said output means of said Nth digital chaotic map cell being functionally connected to said second input means of the (N–1)th combiner means;
said output means of said (N–1)th combiner means being functionally connected to the input means of the (N–1) digital chaotic map cell;
said output means of said (N–1)th digital chaotic map cell being functionally connected to the second input means of the (N–2) combiner cell;
said output means of said (N–2)th combiner means being functionally connected to the input means of the (N–2) digital chaotic map cell;
with said interconnection progression continuing to the point that the output means of the (N–(N–2))th combiner means is functionally connected to the input means of the 1st digital chaotic map cell;
the output means of said first digital chaotic map cell being functionally connected to said input means of said quantizer;
such that in use:
a. each of said N, m-bit shift registers, is loaded with an initial m-bits; and
b. each of the N, m-bit shift registers provides input to input means of the combiner means to which it is functionally connected; and
such that:
c. said N combiner means each, in response to input(s) thereto, provides an output which is input to said input means of said corresponding Nth digital chaotic map cell, respectively, which first digital chaotic map cell outputs at least one bit which is input to the quantizer input means, such that said quantizer, in response, produces a string of at least a one output bit(s), one bit of said string of at least one output bit(s) being a first psuedo-noise sequence output bit, and
one bit of said string of at least one output bit(s) is input to the input means of the said first m-bit shift register, thereby sequentially causing bit shifting in each of said N m-bit shift registers so that each of the N combiner means, respectively, provides new input to each of the N digital chaotic map cells, to the end that a new input bit is caused to enter said input means of said quantizer;
such that the quantizer output means outputs a psuedo-noise sequence of at least one bit(s).

23. An N stage psuedo-noise (PN) sequence generator system as in claim 22, in which step c. is repeated at least two times.

24. An N stage psuedo-noise (PN) sequence generator system as in claim 22, in which at least one of the N combiner means comprises:
summation-and-divide-by-two means;
m-bit shift register accessed by said second input thereto;
means for accepting m-bits from said first input thereto;
such that in use each said summation-and-divide-by-two means is provided binary inputs from both said:
m-bit shift register accessed by said second input thereto;
means for accepting m-bits from said first input thereto;
and provides an m-bit binary half-sum thereof at its output.

25. An N stage psuedo-noise (PN) sequence generator system as in claim 22, in which the Nth combiner means functionally connects an output from the Nth m-bit shift register the input of the Nth digital chaotic map cell.

26. An N stage psuedo-noise (PN) sequence generator system as in claim 22, in which step c. is repeated at least N×m times.

27. A parallel psuedo-noise (PN) generating system comprising:
A. at least two N stage psuedo-noise (PN) sequence generator systems, wherein each said N stage psuedo-noise (PN) sequence generator system comprises:
N digital chaotic map cells each having input means and output means, which digital chaotic map cells each perform directly quantized output/input mapping functions;
N combiner means which each comprise at least first input means, and an output means;
N m-bit shift registers, each having input means and at least one selection from the group consisting of:
parallel output means; and
series output means; and
a quantizer having input and output means;
said output means of said quantizer being functionally connected to the input means of said first m-bit shift register, and
said parallel output means of each of the first to the N–1th m-bit shift register being functionally connected to the first input means of the corresponding Nth combiner means;

the series output means of said 1st m-bit shift register being functionally connected to the input means of the (N−(N−2)) m-bit shift register; and the series output means of said (N−(N−2) m-bit shift register being functionally connected to the input means of the (N−(N−3)) m-bit shift register; with said interconnection progression continuing to the point that the series output means of the (N−1)th m-bit shift register is functionally interconnected to the input of the Nth m-bit shift register;

a selection from the group consisting of:
   parallel output means; and
   series output means;
of said Nth m-bit shift register being functionally connected to a selection from the group consisting of:
   first input means; and
   second input means;
of said Nth combiner means;

said output means of said Nth combiner means being functionally connected to said input means of said Nth digital chaotic map cell, and said output means of said Nth digital chaotic map cell being functionally connected to said second input means of the (N−1)th combiner means;

said output means of said (N−1)th combiner means being functionally connected to the input means of the (N−1) digital chaotic map cell;

said output means of said (N−1)th digital chaotic map cell being functionally connected to the second input means of the (N−2) combiner cell;

said output means of said (N−2)th combiner means being functionally connected to the input means of the (N−2) digital chaotic map cell;

with said interconnection progression continuing to the point that the output means of the (N−(N−2))th combiner means is functionally connected to the input means of the 1st digital chaotic map cell;

the output means of said first digital chaotic map cell being functionally connected to said input means of said quantizer;

such that in use:
   a. each of said N, m-bit shift registers, is loaded with an initial m-bits; and
   b. each of the N, m-bit shift registers provides input to the first input means of the combiner means to which it is functionally connected; and such that:
   c. said N combiner means each, in response to input(s) thereto provides an output which is input to said input means of said corresponding Nth digital chaotic map cell, respectively, which first digital chaotic map cell outputs at least one bit which is input to the quantizer input means, such that said quantizer, in response, produces a string of at least a one output bit(s), one of said string of at least one output bit(s) being a first psuedo-noise sequence output bit, and one bit of said string of at least one output bit(s) is input to the input means of the said first m-bit shift register, thereby sequentially causing bit shifting in each of said N m-bit shift registers so that each of the N combiner means, respectively, provides new input to each of the N digital chaotic map cells, to the end that a new input bit is caused to enter said input means of said quantizer;

such that the quantizer output means is caused to output a psuedo-noise sequence of at least one bit(s);

B. control means for selecting access to the quantizer output means of one of said at least two N stage psuedo-noise (PN) sequence generator systems.

28. A series psuedo-noise (PN) generating system comprising:
   A. an N stage psuedo-noise (PN) sequence generator system, wherein said N stage psuedo-noise (PN) sequence generator system comprises:
      N digital chaotic map cells each having input means and output means, which digital chaotic map cells each perform directly quantized output/input mapping functions;
      N combiner means which each comprise at least first input means, and output means;
      N m-bit shift registers, each having input means and at least one selection from the group consisting of:
         parallel output means; and
         series output means; and
      a quantizer having input and output means;
   said output means of said quantizer being functionally connected to the input means of said first m-bit shift register, and
      said parallel output means of each of the first to the N−1th m-bit shift register being functionally connected to the first input means of the corresponding Nth combiner means;

the series output means of said 1st m-bit shift register being functionally connected to the input means of the (N−(N−2)) m-bit shift register; and the series output means of said (N−(N−2) m-bit shift register being functionally connected to the input means of the (N−(N−3)) m-bit shift register;

with said progression continuing to the point that the series output means of the (N−1)th m-bit shift register is functionally interconnected to the input of the Nth m-bit shift register;

a selection from the group consisting of:
   parallel output means; and
   series output means;
of said Nth m-bit shift register being functionally connected to a selection from the group consisting of:
   first input means; and
   second input means;
of said Nth combiner means;

said output means of said Nth combiner means being functionally connected to said input means of said Nth digital chaotic map cell, and said output means of said Nth digital chaotic map cell being functionally connected to said second input means of the (N−1)th combiner means;

said output means of said (N−1)th combiner means being functionally connected to the input means of the (N−1) digital chaotic map cell;

said output means of said (N−1)th digital chaotic map cell being functionally connected to the second input means of the (N−2) combiner cell;

said output means of said (N−2)th combiner means being functionally connected to the input means of the (N−2) digital chaotic map cell;

with said interconnection progression continuing to the point that the output means of the (N−(N−2))th combiner means is functionally connected to the input means of the 1st digital chaotic map cell;

the output means of said first digital chaotic map cell being functionally connected to said input means of said quantizer;

such that in use:
   a. each of said N, m-bit shift registers, is loaded with an initial m-bits; and b. each of the N, m-bit shift registers provides input to the first input means of the combiner means to which it is functionally connected; and such that:

c. said N combiner means each, in response to input(s) thereto provides an output which is input to said input means of said corresponding Nth digital chaotic map cell, respectively, which first digital chaotic map cell outputs at least one bit which is input to the quantizer input means, such that said quantizer, in response, produces a string of at least a one output bit(s), one of said string of at least one output bit(s) being a first psuedo-noise sequence output bit, and one bit of said string of at least one output bit(s) is input to the input means of the said first m-bit shift register, thereby sequentially causing bit shifting in each of said N m-bit shift registers so that each of the N combiner means, respectively, provides new input to each of the N digital chaotic map cells, to the end that a new input bit is caused to enter said input means of said quantizer;

such that the quantizer output means is caused to output a psuedo-noise sequence of at least one bit(s);

B. control means for selecting how many stages N the psuedo-noise (PN) sequence generator system comprises at a given time.

29. A method of generating a psuedo-noise (PN) sequence comprising the steps of:

A. providing a psuedo-noise (PN) sequence generator comprising N stages, each of said N stages comprising a digital chaotic map cell having input means and output means, which digital chaotic map cell performs a quantized output/input mapping function such that a binary input thereto results in a binary output therefrom;

in which the Nth stage comprises:

a digital chaotic map cell having input means and output means, which digital chaotic map cell performs a directly quantized output/input mapping function;

a combiner means comprising at least a first input means, and an output means;

an m-bit shift register having input means and at least one selection from the group consisting of:
  parallel output means; and
  series output means;

said psuedo-noise (PN) sequence generator further comprising a quantizer having input and output means;

said output means of said quantizer being directly for N=1, or indirectly through at least a first m-bit shift register for N>1, functionally connected to the input means of said Nth stage m-bit shift register, and a selection from the group consisting of:
  said parallel output means; and
  said series output means;

of said Nth stage m-bit shift register being functionally connected to said first input means of said Nth stage combiner means; and optionally a selection from the group consisting of:
  said series output means; and
  said parallel output means;

of said Nth stage m-bit shift register being functionally connected a second input means of said Nth stage combiner means;

said output means of said Nth stage combiner means being functionally connected to said input means of said Nth stage digital chaotic map cell, and said output means of said Nth stage digital chaotic map cell, being directly for N=1, or indirectly through at least a first stage digital chaotic map cell for N>1, functionally connected to said input means of said quantizer;

such that in use:

a. said Nth stage m-bit shift register is loaded with an initial m-bits; and b. said Nth stage m-bit shift register parallel output and/or series output provides input to the Nth stage combiner means;

such that:

c. said Nth stage combiner means, in response to input(s) from the Nth stage m-bit shift register, provides an output which is input to said input means of said Nth stage digital chaotic map cell, which Nth stage digital chaotic map cell outputs at least one bit which causes a bit to be input to the quantizer input means, such that said quantizer, in response, produces a string of at least a one output bit(s), one bit of said string of at least one output bit(s) being a first psuedo-noise sequence output bit, and one bit of said string of at least one output bit(s) causes input of a bit to the input means of the said Nth stage m-bit shift register, thereby sequentially causing bit shifting therein so that new input is provided to the Nth stage digital chaotic map cell, to the end that a new input bit is caused to enter said input means of said quantizer;

the result being that the quantizer output means outputs a psuedo-noise sequence of at least one bit(s);

B. causing each of the N m-bit shift registers to be loaded with an initial m-bits.

30. An N stage psuedo-noise (PN) sequence generator system in which each (N−1) stage comprises:

digital chaotic map cell having input means and output means, which digital chaotic map cell performs a directly quantized output/input mapping function;

combiner means which comprises first and second input means, and output means; and m-bit shift register having input means and parallel output means and series output means;

which psuedo-noise (PN) sequence generator system further comprises a quantizer having input and output means;

said output means of said quantizer being functionally connected to the input means of said first m-bit shift register, and said parallel output means of each of the (N−1) m-bit shift registers being functionally connected to the first input means of the corresponding combiner means;

the series output means of said first stage m-bit shift register being functionally connected to the input means of the second m-bit shift register;

the output of said second digital chaotic map cell being functionally connected to the second input of the first combiner means;

the output of the first combiner means being functionally connected to the input of the first digital chaotic map cell;

the output means of said first digital chaotic map cell being functionally connected to said input means of said quantizer;

such that in use:

a. each of said N, m-bit shift registers, is loaded with an initial m-bits; and b. the parallel output of each of the first and second m-bit shift registers provides input to first input means of the first and second combiner means respectively, to which it is functionally connected; and such that:

c. said first and second combiner means each, in response to input(s) thereto, provides an output which is input to said input means of said corresponding first and second digital chaotic map cell, respectively, which first digital chaotic map cell outputs at least one bit which is input to the quantizer input means, such that said quantizer, in response, produces a string of at least a one output bit(s), one bit of said string of at least one output bit(s) being a first psuedo-noise sequence output bit, and one bit of said string of at least one output bit(s) is input to the input means of the said first m-bit shift register, thereby sequentially causing bit shifting in each of said N m-bit shift registers so that each of the N combiner means, respectively, provides new input to each of the N digital chaotic map cells, to the end that a new input bit is caused to enter said input means of said quantizer;

such that the quantizer output means outputs a psuedo-noise sequence of at least one bit(s).

31. A method of generating a psuedo-noise (PN) sequence comprising the steps of:
   A. providing an N stage psuedo-noise (PN) sequence generator system in which each (N-1) stage comprises:
     digital chaotic map cell having input means and output means, which digital chaotic map cell performs a directly quantized output/input mapping function;
     combiner means which comprises first and second input means, and output means; and
     m-bit shift register having input means and parallel output means and series output means;
   which psuedo-noise (PN) sequence generator system further comprises a quantizer having input and output means;
   said output means of said quantizer being functionally connected to the input means of said first m-bit shift register, and
   said parallel output means of each of the (N-1) m-bit shift registers being functionally connected to the first input means of the corresponding combiner means;
   the series output means of said first stage m-bit shift register being functionally connected to the input means of the second m-bit shift register;
   the output of said second digital chaotic map cell being functionally connected to the second input of the first combiner means;
   the output of the first combiner means being functionally connected to the input of the first digital chaotic map cell;
   the output means of said first digital chaotic map cell being functionally connected to said input means of said quantizer;
   such that in use:
     a. each of said N, m-bit shift registers, is loaded with an initial m-bits; and
     b. the parallel output of each of the first and second m-bit shift registers provides input to first input means of the first and second combiner means respectively, to which it is functionally connected; and
   such that:
     c. said first and second combiner means each, in response to input(s) thereto, provides an output which is input to said input means of said corresponding first and second digital chaotic map cell, respectively, which first digital chaotic map cell outputs at least one bit which is input to the quantizer input means, such that said quantizer, in response, produces a string of at least a one output bit(s), one bit of said string of at least one output bit(s) being a first psuedo-noise sequence output bit, and
   one bit of said string of at least one output bit(s) is input to the input means of the said first m-bit shift register, thereby sequentially causing bit shifting in each of said N m-bit shift registers so that each of the N combiner means, respectively, provides new input to each of the N digital chaotic map cells, to the end that a new input bit is caused to enter said input means of said quantizer;
   such that the quantizer output means outputs a psuedo-noise sequence of at least one bit(s);
   B. causing each of the N m-bit shift registers to be loaded with an initial m-bits.

* * * * *